(12) United States Patent
Arishima

(10) Patent No.: US 11,465,392 B2
(45) Date of Patent: Oct. 11, 2022

(54) INTERLAYER FILM FOR LAMINATED GLASS, AND LAMINATED GLASS

(71) Applicant: KURARAY CO., LTD., Kurashiki (JP)

(72) Inventor: Hiroyuki Arishima, Kurashiki (JP)

(73) Assignee: KURARAY EUROPE GMBH, Hattersheim am Main (DE)

( * ) Notice: Subject to any disclaimer, the term of this patent is extended or adjusted under 35 U.S.C. 154(b) by 64 days.

(21) Appl. No.: 17/255,683

(22) PCT Filed: Jun. 27, 2019

(86) PCT No.: PCT/JP2019/025680
§ 371 (c)(1),
(2) Date: Dec. 23, 2020

(87) PCT Pub. No.: WO2020/004577
PCT Pub. Date: Jan. 2, 2020

(65) Prior Publication Data
US 2021/0268773 A1    Sep. 2, 2021

(30) Foreign Application Priority Data

Jun. 29, 2018 (JP) .............................. JP2018-124594

(51) Int. Cl.
*B32B 17/10* (2006.01)
*B32B 27/22* (2006.01)
*B32B 27/08* (2006.01)
*B32B 27/30* (2006.01)

(52) U.S. Cl.
CPC ........ *B32B 17/10027* (2013.01); *B32B 17/10* (2013.01); *B32B 17/10045* (2013.01); *B32B 17/10605* (2013.01); *B32B 17/10651* (2013.01); *B32B 17/10678* (2013.01); *B32B 17/10761* (2013.01); *B32B 27/22* (2013.01); *B32B 27/302* (2013.01); *B32B 27/306* (2013.01); *B32B 2250/05* (2013.01); *B32B 2250/40* (2013.01); *B32B 2307/546* (2013.01); *B32B 2307/56* (2013.01); *B32B 2605/006* (2013.01)

(58) Field of Classification Search
None
See application file for complete search history.

(56) References Cited

U.S. PATENT DOCUMENTS

| 2006/0008658 | A1 | 1/2006 | Fukatani et al. |
| 2014/0227489 | A1 | 8/2014 | Inui |
| 2017/0334173 | A1* | 11/2017 | Yui .................. B32B 17/10678 |
| 2018/0082669 | A1 | 3/2018 | Lu |
| 2018/0290437 | A1 | 10/2018 | Kobayashi et al. |

FOREIGN PATENT DOCUMENTS

| EP | 3 459 982 A1 | 3/2019 |
| JP | 2007-91491 A | 4/2007 |
| JP | 2016-108229 A | 6/2016 |
| WO | WO 2005/018969 A1 | 3/2005 |
| WO | WO 2013/031884 A1 | 3/2013 |
| WO | WO 2016/076339 A1 | 5/2016 |
| WO | WO 2017/199983 A1 | 11/2017 |

OTHER PUBLICATIONS

International Preliminary Report on Patentability and Written Opinion dated Dec. 29, 2020 in PCT/JP2019/025680 (submitting English translation only), 10 pages.
International Search Report dated Aug. 6, 2019 in PCT/JP2019/025680, 2 pages.

* cited by examiner

*Primary Examiner* — Sheeba Ahmed
(74) *Attorney, Agent, or Firm* — Oblon, McClelland, Maier & Neustadt, L.L.P.

(57) ABSTRACT

An interlayer film for a laminated glass, containing in sequence an A layer, a C layer, and an A layer, and also containing a B layer at any place between or outside these layers, wherein each A layer contains a first thermoplastic resin, a resin material constituting each A layer has a tan δ peak of −30° C. to 10° C., the resin material of at least one layer of the A layers has a peak height of a tan δ of 1.5 or more, the B layer contains a second thermoplastic resin, and is constituted of a resin material different from the resin material constituting the A layer, and the C layer is a layer composed of an inorganic glass having a thickness of 0.1 mm to 1.5 mm, or a layer having a thickness of 0.25 mm to 2.5 mm and containing a third thermoplastic resin.

21 Claims, 1 Drawing Sheet

INTERLAYER FILM FOR LAMINATED GLASS, AND LAMINATED GLASS

TECHNICAL FIELD

The present invention relates to an interlayer film for a laminated glass, and a laminated glass.

BACKGROUND ART

It is known that a glass plate used for a window glass or the like has excellent durability and daylighting properties, but the damping performance (tan δ against flexural vibration) is very poor. Thus, a decrease in a sound insulation due to a resonance state caused by a vibration of the glass and an incident sound wave, that is, a coincidence effect is significant.

In recent years, efforts have been made to reduce the weight of a laminated glass to reduce the weight of vehicles (for example, automobiles) and improve fuel efficiency. Although the weight of the laminated glass can be generally reduced by reducing the thickness of the laminated glass, the sound insulation decreases according to the degree of the weight reduction. Thus, for realization of the weight reduction, a means to compensate the sound insulation decrease is required.

As a method of increasing sound insulation, there is a method in which an interlayer film for a laminated glass (hereinafter, also simply referred to as "interlayer film") having excellent damping performance is used. The interlayer film is capable of converting vibration energy into heat energy and absorbing the vibration energy. As examples of such an interlayer film, there have been proposed an interlayer film for a laminated glass comprising polyvinyl butyral and having a certain level of impact resistance and sound insulation (see, for example, Patent Document 1), an interlayer film comprising a resin film A and a resin film B in which the resin film A comprising a copolymer of polystyrene and a rubber based resin is sandwiched and fixed between the resin film B comprising a plasticized polyvinyl acetal resin (see, for example, Patent Document 2), and an interlayer film having a laminate in which 10 or more first layers containing polyvinyl acetal and a plasticizer are laminated (see, for example, Patent Document 3).

PRIOR ART DOCUMENTS

Patent Documents

Patent Document 1: WO 2005/018969
Patent Document 2: JP-A-2007-91491
Patent Document 3: WO 2013/031884

SUMMARY OF THE INVENTION

Problems to be Solved by the Invention

However, even when interlayer films for a laminated glass as described in the above-mentioned Patent Documents are used, the sound insulation properties of a laminated glass are not quite satisfactory, and further improvement in sound insulation properties is required due to requirements and the like for increased comfort of the environment in vehicles, or for improvement in fuel efficiency of automobiles by weight reduction of a laminated glass.

Thus, an object of the present invention is to provide an interlayer film for a laminated glass having high sound insulation properties.

Solutions to the Problems

As a result of intensive studies, the present inventors have found that the above-mentioned problems can be solved by an interlayer film for a laminated glass comprising an A layer, a B layer and a C layer that are composed of specific materials in a specific order, thereby completing the present invention. That is, the present invention provides the following preferable embodiments.

[1] An interlayer film for a laminated glass, comprising in sequence an A layer, a C layer, and an A layer, and comprising at any place between or outside these layers, a B layer, wherein each A layer is a layer containing a first thermoplastic resin, a resin material constituting each A layer has a peak at which a tan δ measured by performing a complex shear viscosity test under a condition of a frequency of 1 Hz according to JIS K 7244-10: 2005 is maximum in a range of −30° C. or more and 10° C. or less, the resin material of at least one layer of the A layers has a height of the peak of a tan δ of 1.5 or more, the C layer is a layer composed of an inorganic glass having a thickness of 0.1 mm or more and 1.5 mm or less, or a layer having a thickness of 0.25 mm or more and 2.5 mm or less and containing a third thermoplastic resin, and when the C layer is the layer containing a third thermoplastic resin, a resin material constituting the C layer has a tensile storage elastic modulus at 0° C. measured by performing a dynamic viscoelasticity test under a condition of a frequency of 0.3 Hz according to JIS K 7244-4:1999 of 1.0 GPa or more, and the B layer is a layer containing a second thermoplastic resin, and is constituted of a resin material different from the resin material constituting the A layer.

[2] The interlayer film for a laminated glass according to the above [1], wherein each A layer contains a hydrogenated product of a block copolymer having a polymer block (a) containing 60 mol % or more of an aromatic vinyl monomer unit and a polymer block (b) containing 60 mol % or more of a conjugated diene monomer unit as the first thermoplastic resin, and the hydrogenated product of the block copolymer has a content of the polymer block (a) of 25% by mass or less based on a total mass of the hydrogenated product of the block copolymer.

[3] The interlayer film for a laminated glass according to the above [1] or [2], wherein the B layer contains a polyvinyl acetal resin or an ionomer resin as the second thermoplastic resin.

[4] The interlayer film for a laminated glass according to the above [3], wherein a content of a plasticizer is 50 parts by mass or less relative to 100 parts by mass of the polyvinyl acetal resin.

[5] The interlayer film for a laminated glass according to the above [4], wherein the plasticizer is an ester-based plasticizer or an ether-based plasticizer having a melting point of 30° C. or less and a hydroxyl value of 15 to 450 mgKOH/g.

[6] The interlayer film for a laminated glass according to any one of the above [1] to [5], wherein the inorganic glass is a chemically strengthened inorganic glass.

[7] The interlayer film for a laminated glass according to any one of the above [1] to [5], wherein the C layer contains any of an acrylic resin, a polycarbonate resin, a polyester resin, or a polyvinyl acetal resin as the third thermoplastic resin.

[8] The interlayer film for a laminated glass according to the above [7], wherein a content of a plasticizer is 30 parts by mass or less relative to 100 parts by mass of the polyvinyl acetal resin.

[9] The interlayer film for a laminated glass according to the above [8], wherein the plasticizer is an ester-based plasticizer or an ether-based plasticizer having a melting point of 30° C. or less and a hydroxyl value of 15 to 450 mgKOH/g.

[10] The interlayer film for a laminated glass according to any one of the above [1] to [9], wherein in a laminated glass obtained by sandwiching the interlayer film for a laminated glass using a float glass having a length of 300 mm, a width of 25 mm, and a thickness of 19 mm and a chemically strengthened inorganic glass having a length of 300 mm, a width of 25 mm, and a thickness of 0.55 mm, a loss factor at a third resonance frequency measured by a center excitation method at 20° C. is 0.55 or more.

[11] The interlayer film for a laminated glass according to any one of the above [1] to [10], wherein a difference ΔTL between a sound transmission loss (TL1-a) based on mass law given by a sound field incidence of 0° to 78° and a sound transmission loss (TL2-a) calculated from a loss factor at a third resonance frequency measured by a center excitation method at 20° C. and a flexural rigidity at the third resonance frequency calculated according to ISO 16940: 2008 in a laminated glass obtained by sandwiching the interlayer film for a laminated glass using a float glass having a length of 300 mm, a width of 25 mm, and a thickness of 1.9 mm and a chemically strengthened inorganic glass having a length of 300 mm, a width of 25 mm, and a thickness of 0.55 mm is 4.1 dB or less at each center frequency in a ⅓ octave band of 1,000 Hz or more.

[12] The interlayer film for a laminated glass according to any one of the above [1] to [11], wherein in a laminated glass obtained by sandwiching the interlayer film for a laminated glass using two float glasses, each having a length of 300 mm, a width of 25 mm, and a thickness of 1.9 mm, a loss factor at a third resonance frequency measured by a center excitation method at 20° C. is 0.55 or more.

[13] The interlayer film for a laminated glass according to any one of the above [1] to [12], wherein a difference ΔTL between a sound transmission loss (TL1-b) based on mass law given by a sound field incidence of 0° to 78° and a sound transmission loss (TL2-b) calculated from a loss factor at a third resonance frequency measured by a center excitation method at 20° C. and a flexural rigidity at the third resonance frequency calculated according to ISO 16940: 2008 in a laminated glass obtained by sandwiching the interlayer film for a laminated glass using two float glasses, each having a length of 300 mm, a width of 25 mm, and a thickness of 1.9 mm, is 4.1 dB or less at each center frequency in a ⅓ octave band of 1,000 Hz or more.

[14] The interlayer film for a laminated glass according to any one of the above [1] to [13], wherein at least one layer in the interlayer film for a laminated glass contains a heat shield material.

[15] The interlayer film for a laminated glass according to the above [14], wherein the heat shield material is at least one selected from the group consisting of
tin-doped indium oxide, antimony-doped tin oxide, zinc antimonate, metal-doped tungsten oxide, diimonium-based dye, aminium-based dye, phthalocyanine-based dye, anthraquinone-based dye, polymethine-based dye, a benzenedithiol-type ammonium-based compound, a thiourea derivative, thiol metal complex, aluminum-doped zinc oxide, tin-doped zinc oxide, silicon-doped zinc oxide, lanthanum hexaboride, and vanadium oxide.

[16] The interlayer film for a laminated glass according to any one of the above [1] to [15], wherein at least one layer in the interlayer film for a laminated glass contains an ultraviolet absorber.

[17] The interlayer film for a laminated glass according to the above [16], wherein the ultraviolet absorber is at least one selected from the group consisting of a benzotriazole-based compound, a benzophenone-based compound, a triazine-based compound, a hindered amine-based compound, a benzoate-based compound, a malonic ester-based compound, an indole-based compound, and an anilide oxalate-based compound.

[18] The interlayer film for a laminated glass according to any one of the above [1] to [17], wherein
the interlayer film for a laminated glass at least comprises in sequence the A layer, the B layer, the C layer, the B layer, and the A layer,
the C layer is directly adjacent to each of the two B layers, and
the C layer is a layer composed of an inorganic glass.

[19] The interlayer film for a laminated glass according to any one of the above [1] to [17], wherein the interlayer film for a laminated glass at least comprises in sequence the B layer, the A layer, the C layer, and the A layer.

[20] The interlayer film for a laminated glass according to the above [19], wherein the C layer is the layer containing a third thermoplastic resin.

[21] A laminated glass comprising:
two transparent substrates; and
the interlayer film for a laminated glass according to any one of the above [1] to [20] sandwiched between the two transparent substrates,
wherein at least one of the two transparent substrates is an inorganic glass having a thickness of 1.2 to 3.0 mm.

[22] The laminated glass according to the above [21], which is a windshield for a vehicle, a side window for a vehicle, a sunroof for a vehicle, a rear window for a vehicle, or a glass for a head up display.

Effects of the Invention

According to the present invention, an interlayer film having high sound insulation properties can be provided.

EMBODIMENTS OF THE INVENTION

Figure 1:
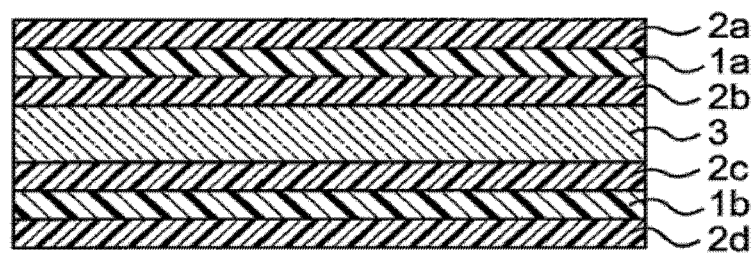
FIG. 1 shows a schematic sectional view showing a structure of one embodiment of an interlayer film for a laminated glass of the present invention.

Hereinafter, embodiments of the present invention will be described in detail. The scope of the present invention is not limited to the embodiments described here, and various modifications can be made without departing from the spirit of the present invention.

The interlayer film for a laminated glass of the present invention comprises in sequence an A layer, a C layer, and an A layer, and comprises at any place between or outside these layers, a B layer. Each A layer is a layer containing a first thermoplastic resin, a resin material constituting each A layer has a peak at which a tan δ measured by performing a complex shear viscosity test under a condition of a frequency of 1 Hz according to JIS K 7244-10: 2005 is maximum in a range of −30° C. or more and 10° C. or less (hereinafter, this temperature may be referred to as "tan δ peak temperature"), and the resin material of at least one layer of the A layers has a height of the peak of a tan δ of 1.5 or more (hereinafter, may be referred to as "tan δ peak height"). The C layer is a layer composed of an inorganic glass having a thickness of 0.1 mm or more and 15 mm or less, or a layer having a thickness of 0.25 mm or more and 25 mm or less and containing a third thermoplastic resin, and when the C layer is the layer containing a third thermoplastic resin, a resin material constituting the C layer has a tensile storage elastic modulus at 0° C. measured by performing a dynamic viscoelasticity test under a condition of a frequency of 0.3 Hz according to JIS K 7244-4:1999 of 1.0 GPa or more. In the present invention, even when the C layer is composed of an inorganic glass, the present invention is described as an "interlayer film" for convenience. The B layer is a layer containing a second thermoplastic resin, and is constituted of a resin material different from the resin material constituting the A layer.

<A Layer>

The interlayer film for a laminated glass of the present invention comprises at least two A layers containing the first thermoplastic resin. The A layer is a layer that provides high sound insulation to the interlayer film for a laminated glass when the A layers are included in the interlayer film for a laminated glass in sequence of the A layer, the C layer, and the A layer. The resin material constituting the A layer is composed of the first thermoplastic resin or a resin composition containing the first thermoplastic resin. The first thermoplastic resin is not particularly limited as long as the resin material constituting the A layer satisfies the conditions of the above-mentioned tan δ peak temperature and tan δ peak height. Although it is sufficient that any one of the multiple A layers satisfies the condition of the tan δ peak height, it is more preferable that all of the A layers satisfy the condition. Preferably, the A layer contains a hydrogenated product of a block copolymer having a polymer block (a) containing 60 mol % or more of an aromatic vinyl monomer unit and a polymer block (b) containing 60 mol % or more of a conjugated diene monomer unit as the first thermoplastic resin (hereinafter, also referred to as "block copolymer (A)"), and the hydrogenated product of a block copolymer has a content of the polymer block (a) of 25% by mass or less based on a total mass of the hydrogenated product of a block copolymer.

Examples of the aromatic vinyl compound constituting the aromatic vinyl monomer unit include styrene, o-methylstyrene, m-methylstyrene, p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxy styrene, m-methoxy styrene, p-methoxystyrene, o-chloromethylstyrene, m-chloromethylstyrene, p-chloromethylstyrene, o-bromomethylstyrene, m-bromomethylstyrene, p-bromomethylstyrene, styrene derivatives substituted with silyl groups, indenes, and vinylnaphthalene. One aromatic vinyl compound can be used alone, or two or more aromatic vinyl compounds can be used in combination. Among them, from the viewpoint of production cost and physical property balance, styrene, α-methylstyrene, p-methylstyrene, and mixtures thereof are preferable, and styrene is more preferable.

The content of the aromatic vinyl monomer unit in the polymer block (a) is preferably 60 mol % or more, more preferably 80 mol % or more, more preferably 85 mol % or more, further preferably 90 mol % or more, particularly preferably 95 mol % or more, and can be substantially 100 mol % based on all of the structural units constituting the polymer block (a). When the content of the aromatic vinyl monomer unit in the polymer block (a) is not less than the lower limit, good moldability or mechanical strength can be easily obtained.

The polymer block (a) can contain a structural unit derived from another unsaturated monomer other than the aromatic vinyl monomer unit as long as the object and effects of the present invention are not impaired. Examples of another unsaturated monomer include butadiene, isoprene, 2,3-dimethylbutadiene, 1,3-pentadiene, 1,3-hexadiene, isobutylene, methyl methacrylate, methyl vinyl ether, N-vinylcarbazole, β-pinene, 8,9-p-mentene, dipentene, methylene norbornene, and 2-methylene tetrahydrofuran.

The content of another unsaturated monomer unit in the polymer block (a) is preferably less than 40 mol %, more preferably less than 20 mol %, more preferably less than 15 mol %, further more preferably less than 10 mol %, and particularly preferably less than 5 mol % based on all of the structural units constituting the polymer block (a). In a preferable embodiment of the present invention, the polymer block (a) substantially does not contain another unsaturated monomer unit described above. When the polymer block (a) contains a unit derived from another unsaturated monomer described above, the binding form is not particularly limited, and can be random or tapered.

The content of the aromatic vinyl monomer unit and the content of another unsaturated monomer unit in the polymer block (a) in the block copolymer (A) can be determined from the $^1$H-NMR spectrum of the block copolymer (A), and can be adjusted to desired contents by adjusting the charge ratio of each monomer in the preparation of the block copolymer (A).

The block copolymer (A) only needs to have at least one polymer block (a). When the block copolymer (A) has two or more polymer blocks (a), the two or more polymer blocks (a) can be the same or different from each other. In the present specification, "different polymer blocks" means that at least one of the monomer unit constituting the polymer block, the weight average molecular weight, the stereoregularity, and, in a case where the polymer block has multiple monomer units, the ratio of each monomer unit and the form of copolymerization (random, gradient, block) is different. This also applies to the polymer block (b) described later.

The weight average molecular weight (Mw) of the polymer block (a) contained in the block copolymer (A) is not particularly limited. The weight average molecular weight of at least one polymer block (a) of the polymer blocks (a) contained in the block copolymer (A) is preferably 3,000 to 60,000, and more preferably 4,000 to 50,000. When the block copolymer (A) has at least one polymer block (a) having a weight average molecular weight within the above-mentioned range, the mechanical strength is more improved and a good film-forming property can be easily obtained. The weight average molecular weight is a weight average molecular weight in terms of polystyrene determined by gel permeation chromatography (GPC) measurement.

The glass transition temperature of the polymer block (a) is preferably 120° C. or less, more preferably 110° C. or less, preferably 60° C. or more, and more preferably 70° C. or more. When the glass transition temperature of the polymer block (a) is within the range between the lower limit and the upper limit described above, the shear storage elastic modulus of the resin material constituting the A layer can be easily controlled to a specific range, which leads to the improved sound insulation and the increased mechanical strength of the obtained interlayer film. The glass transition temperature of the polymer block (a) can be measured by the method described in Examples below, and can be adjusted to a desired range by adjusting the charge ratio of each monomer in the preparation of the block copolymer (A).

The content of the polymer block (a) in the hydrogenated product of the block copolymer (A) [the total content thereof when the block copolymer (A) has multiple polymer blocks (a)] is preferably 25% by mass or less based on the total mass of the hydrogenated product of the block copolymer (A). The value of a tan δ tends to change depending on the morphology of the block copolymer (A), and the tan δ tends to increase especially when a microphase-separated structure having a sphere structure is formed. Because the content of the polymer block (a) in the hydrogenated product of the block copolymer (A) has a great influence on the ease of the formation of a sphere structure, to further improve the sound insulation of the obtained interlayer film, it is very advantageous that the content of the block polymer (a) based on the total mass of the hydrogenated product of the block copolymer (A) is adjusted to preferably 25% by mass or less, more preferably 20% by mass or less, and more preferably 15% by mass or less. The content of the polymer block (a) is more preferably 14% by mass or less, more preferably 13% by mass or less, more preferably 12.5% by mass or less, more preferably 11% by mass or less, and particularly preferably 9% by mass or less. From the viewpoint of sound insulation, the content of the polymer block (a) is preferably 3% by mass or more, and more preferably 3.5% by mass or more. In one embodiment of the present invention, the content of the polymer block (a) is preferably 3 to 25% by mass (for example, 3 to 15% by mass). Meanwhile, from the viewpoint of easily improving the handleability and mechanical properties of the A layer, the content of the polymer block (a) is preferably 6 to 25% by mass (for example, 6 to 15% by mass), more preferably 8 to 25% by mass (for example, 8 to 15% by mass), and particularly preferably 10 to 25% by mass (for example, 10 to 15% by mass). In one embodiment of the present invention, the content of the polymer block (a) is preferably 3.5 to 25% by mass (for example, 3.5 to 15% by mass), and more preferably 4 to 25% by mass (for example 4 to 15% by mass), and when the content of the polymer block (a) is within the above-mentioned range, the handleability and mechanical properties of the obtained A layer can be increased while ensuring high sound insulation.

The content of the polymer block (a) in the hydrogenated product of the block copolymer (A) can be determined from the $^1$H-NMR spectrum of the hydrogenated product of the block copolymer (A), and can be adjusted to a desired range by adjusting the charge ratio of each monomer in the preparation of the block copolymer (A).

Examples of the conjugated diene compound constituting the conjugated diene monomer unit contained in the polymer block (b) include isoprene, butadiene, hexadiene, 2,3-dimethyl-1,3-butadiene, 1,3-pentadiene, and myrcene. One conjugated diene compound can be used alone, or two or more conjugated diene compounds can be used in combination. Among these, isoprene, butadiene, and a mixture of isoprene and butadiene are preferable, and isoprene is more preferable, from the viewpoint of availability, versatility, controllability of the binding form described later and the like.

As the conjugated diene compound, a mixture of butadiene and isoprene can be used. Although the mixing ratio [isoprene/butadiene] (mass ratio) is not particularly limited, it is preferably 5/95 to 95/5, more preferably 10/90 to 90/10, further preferably 40/60 to 70/30, and particularly preferably 45/55 to 65/35. When the mixing ratio [isoprene/butadiene] is represented by a molar ratio, it is preferably 5/95 to 95/5, more preferably 10/90 to 90/10, further preferably 40/60 to 70/30, and particularly preferably 45/55 to 55/45.

The content of the conjugated diene monomer unit in the polymer block (b) is preferably 60 mol % or more, more preferably 65 mol % or more, and particularly preferably 80 mol % or more based on all of the structural units constituting the polymer block (b). When the content of the conjugated diene monomer unit is not less than the lower limit, the amount of the segment providing the sound insulation properties can be sufficient, and an interlayer film excellent in the sound insulation properties can be easily obtained. The upper limit of the content of the conjugated diene monomer unit is not particularly limited. The content of the conjugated diene monomer unit can be 100 mol %.

The polymer block (b) can have only a structural unit derived from one conjugated diene compound or can have structural units derived from two or more conjugated diene compounds. As described above, in the present invention, the polymer block (b) preferably contains 60 mol % or more of the conjugated diene monomer unit. The polymer block (b) preferably contains a structural unit derived from isoprene (hereinafter, may be abbreviated as "isoprene unit"), a structural unit derived from butadiene (hereinafter, may be abbreviated as "butadiene unit"), or the isoprene unit and the butadiene unit as the conjugated diene monomer unit(s) in an amount of 60 mol % or more. This tends to result in an interlayer film having excellent sound insulation.

When the polymer block (b) has two or more conjugated diene monomer units, their binding form can be random, tapered, completely alternating, partially block-shaped, block, or a combination of two or more thereof.

The polymer block (b) can contain a structural unit derived from another polymerizable monomer other than the conjugated diene monomer unit as long as the object and effects of the present invention are not impaired. Examples of another polymerizable monomer include styrene, α-methylstyrene, o-methylstyrene, m-methyl styrene, p-methyl styrene, p-t-butylstyrene, 2,4-dimethylstyrene, aromatic vinyl compounds such as vinylnaphthalene and vinylanthracene, and methyl methacrylate, methyl vinyl ether, N-vinylcarbazole, β-pinene, 8,9-p-mentene, dipentene, methylenenorbornene, 2-methylenetetrahydrofuran, 1,3-cyclopentadiene, 1,3-cyclohexadiene, 1,3-cycloheptadiene, and 1,3-cyclooctadiene. Among them, styrene, α-methylstyrene, and p-methylstyrene are preferable, and styrene is more preferable. When the polymer block (b) contains another polymerizable monomer unit described above, the specific combination is preferably isoprene and styrene, and butadiene and styrene, and more preferably isoprene and styrene. When the polymer block (b) contains such a combination, the tan δ of the resin material constituting the A layer may increase.

The content of another polymerizable monomer unit in the polymer block (b) is preferably less than 40 mol %, more preferably less than 35 mol %, and particularly preferably less than 20 mol % based on all of the structural units constituting the polymer block (b). When the polymer block (b) contains another polymerizable monomer unit described above, the binding form is not particularly limited, and can be random or tapered.

The content of the conjugated diene monomer unit and the content of another polymerizable monomer unit in the polymer block (b) in the block copolymer (A) can be determined from the $^1$H-NMR spectrum of the block copolymer (A), and can be adjusted to desired contents by adjusting the charge ratio of each monomer in the preparation of the block copolymer (A).

When the structural unit constituting the polymer block (b) contains an isoprene unit or a butadiene unit, the binding form of isoprene can be a 1,2-bond, a 3,4-bond, or a 1,4-bond, and the binding form of butadiene can be a 1,2-bond or a 1,4-bond.

The total content of the 3,4-bond unit and the 1,2-bond unit in the polymer block (b) in the block copolymer (A) (hereinafter may be referred to as "vinyl bond content") is preferably 20 mol % or more, more preferably 40 mol % or more, and particularly preferably 50 mol % or more. Although the total vinyl bond content is not particularly limited, it is preferably 90 mol % or less, and more preferably 85 mol % or less. The vinyl bond content can be calculated by dissolving the block copolymer (A) before hydrogenation in CDCl$_3$ and measuring the $^1$H-NMR spectrum. When the structural unit constituting the polymer block (b) is composed only of an isoprene unit, the vinyl bond content is calculated from the ratio of the peak areas corresponding to the 3,4-bond unit and the 1,2-bond unit to the total peak area of the isoprene unit. When the structural unit constituting the polymer block (b) is composed only of a butadiene unit, the vinyl bond content is calculated from the ratio of the peak area corresponding to the 1,2-bond unit to the total peak area of the butadiene unit. When the structural unit constituting the polymer block (b) contains an isoprene unit and a butadiene unit, the vinyl bond content is calculated from the ratio of the peak areas corresponding to the 3,4-bond unit and the 1,2-bond unit of the isoprene unit and the 1,2-bond unit of the butadiene unit to the total peak areas of the isoprene unit and the butadiene unit.

As the vinyl bond content increases, the tan δ value of the resin material constituting the A layer tends to increase. Thus, by controlling the peak position of the tan δ within a specific temperature range, the sound insulation of the obtained interlayer film can be improved. The vinyl bond content can be adjusted within a desired range, for example, by adjusting the addition amount of the organic Lewis base used in the anionic polymerization for producing the block copolymer (A).

The weight average molecular weight of the polymer block (b) contained in the block copolymer (A) is, from the viewpoint of sound insulation and the like, preferably 15,000 to 800,000, more preferably 50,000 to 700,000, further preferably 70,000 to 600,000, particularly preferably 90,000 to 500,000, and most preferably 130,000 to 450,000 in the state before hydrogenation. The weight average molecular weight means the weight average molecular weight in terms of polystyrene determined by gel permeation chromatography (GPC) measurement. The weight average molecular weight of the polymer block (b) means a value calculated from the difference between the weight average molecular weight before copolymerization of the polymer block (b) and the weight average molecular weight after the copolymerization of the polymer block (b).

The glass transition temperature of the polymer block (b) is preferably 10° C. or less, more preferably 0° C. or less, preferably −30° C. or more, and more preferably −20° C. or more. When the glass transition temperature of the polymer block (b) is within the range between the lower limit and the upper limit described above, the tan δ peak temperature of the resin material constituting the A layer can be easily controlled to a specific range, which leads to the improved sound insulation of the obtained interlayer film. The glass transition temperature of the polymer block (b) can be measured by the method described in Examples below, and can be adjusted to a desired range by adjusting the charge ratio of each monomer in the preparation of the block copolymer (A).

The block copolymer (A) only needs to have at least one polymer block (b) described above. When the block copolymer (A) has two or more polymer blocks (b), the two or more polymer blocks (b) can be the same or different from each other.

The content of the polymer block (b) in the hydrogenated product of the block copolymer (A) [the total content thereof when the block copolymer (A) has multiple polymer blocks (b)] is preferably 75 to 97% by mass (for example, 85 to 97% by mass) based on the total mass of the hydrogenated product of the block copolymer (A). When the content of the polymer block (b) is within the above-mentioned range, the hydrogenated product of the block copolymer (A) tends to have appropriate flexibility or good moldability. The value of a tan δ tends to change depending on the morphology of the hydrogenated product of the block copolymer (A), and the tan δ tends to increase especially when a microphase-separated structure having a sphere structure is formed. Because the content of the polymer block (b) in the hydrogenated product of the block copolymer (A) has a great influence on the ease of the formation of a sphere structure, to improve the sound insulation of the obtained interlayer film, it is very advantageous that the content of the polymer block (b) based on the total mass of the hydrogenated product of the block polymer (A) is preferably adjusted to 75 to 97% by mass (for example, 85 to 97% by mass). The content of the polymer block (b) is more preferably 75 to 96.5% by mass (for example, 85 to 96.5% by mass), further preferably 75 to 96% by mass (for example, 85 to 96% by mass), and particularly preferably 80 to 96% by mass (for example, 90 to 96% by mass). Meanwhile, from the viewpoint of easily improving the handleability and mechanical properties of the A layer, the content of the polymer block (b) is preferably 75 to 94% by mass (for example, 85 to 94% by mass), more preferably 75 to 92% by mass (for example, 85 to 92% by mass), and particularly preferably 75 to 90% by mass (for example, 85 to 90% by mass). In a preferable embodiment of the present invention, the content of the polymer block (b) is 75 to 96.5% by mass (for example, 85 to 96.5% by mass). When the content of the polymer block (b) is within this range, the handleability and mechanical properties of the obtained A layer can be increased while ensuring high sound insulation.

The content of the polymer block (b) in the hydrogenated product of the block copolymer (A) is determined from the $^1$H-NMR spectrum of the hydrogenated product of the block copolymer (A), and can be adjusted to a desired range by adjusting the charge ratio of each monomer in the preparation of the block copolymer (A).

As long as the polymer block (a) and the polymer block (b) are bound to each other in the block copolymer (A), the binding form is not limited and can be linear, branched, radial, or any combination of two or more these. Among them, the binding form of the polymer block (a) and the polymer block (b) is preferably linear. Examples thereof include, when the polymer block (a) is represented by A and the polymer block (b) is represented by B, a diblock copolymer represented by A-B, a triblock copolymer represented by A-B-A, a tetrablock copolymer represented by A-B-A-B, and a pentablock copolymer represented by A-B-A-B-A. Among them, a linear triblock copolymer or diblock copolymer is preferable, and an A-B-A type triblock copolymer is preferably used from the viewpoint of flexibility and ease of production.

In the present invention, the A layer preferably contains at least one hydrogenated product of the block copolymer (A) (hereinafter, may be referred to as "hydrogenated block copolymer (A)") as the first thermoplastic resin.

From the viewpoint of heat resistance, weather resistance, and sound insulation, 80 mol % or more of the carbon-carbon double bond of the polymer block (b) is preferably hydrogenated (hereinafter, may be abbreviated as "hydrogenation"), 85 mol % or more is more preferably hydrogenated, 88 mol % or more is further preferably hydrogenated, and 90 mol % or more is particularly preferably hydrogenated (hereinafter, this value may be referred to as "hydrogenation rate"). The upper limit of the hydrogenation rate is not particularly limited. The hydrogenation rate can be 99 mol % or less, and can be 98 mol % or less. The hydrogenation rate is a value calculated from the contents of carbon-carbon double bond in the conjugated diene monomer unit in the polymer block (b) determined by $^1$H-NMR measurement before and after hydrogenation.

The weight average molecular weight of the hydrogenated block copolymer (A) determined in terms of standard polystyrene by gel permeation chromatography is preferably 15,000 to 800,000, more preferably 50,000 to 700,000, further preferably 70,000 to 600,000, particularly preferably 90,000 to 500,000, and most preferably 130,000 to 450,000. When the weight average molecular weight of the hydrogenated block copolymer (A) is not less than the lower limit, heat resistance tends to be high, and when the weight average molecular weight of the hydrogenated block copolymer (A) is not more than the upper limit, the moldability tends to be good.

The method for producing the block copolymer (A) is not particularly limited. The block copolymer (A) can be produced by, for example, an anionic polymerization method, a cationic polymerization method, or a radical polymerization method. Specific examples of the anionic polymerization method include the methods described in (i) to (iii) below.

(i) a method of sequentially polymerizing an aromatic vinyl monomer, a conjugated diene monomer, and then an aromatic vinyl monomer using an alkyllithium compound as an initiator;

(ii) a method of sequentially polymerizing an aromatic vinyl monomer and a conjugated diene monomer using an alkyllithium compound as an initiator, and then adding a coupling agent for coupling; and (iii) A method of sequentially polymerizing a conjugated diene monomer and then an aromatic vinyl monomer using a dilithium compound as an initiator.

When a conjugated diene monomer is used, the 1,2-bond amount and the 3,4-bond amount of the first thermoplastic resin can be increased by addition of an organic Lewis base during anionic polymerization, and the 1,2-bond amount and the 3,4-bond amount, that is, the vinyl bond content of the first thermoplastic resin can be easily controlled by adjustment of the addition amount of the organic Lewis base. As the vinyl bond content increases, the tan δ value of the resin material constituting the A layer tends to increase. Thus, by controlling the peak position of the tan δ within a specific temperature range, the sound insulation of the obtained interlayer film can be improved.

Examples of the organic Lewis base include esters such as ethyl acetate; amines such as triethylamine, N,N,N',N'-tetramethylethylenediamine (TMEDA), and N-methylmorpholine; nitrogen-containing heterocyclic aromatic compounds such as pyridine; amides such as dimethylacetamide; ethers such as dimethyl ether, diethyl ether, tetrahydrofuran (THF), and dioxane; glycol ethers such as ethylene glycol dimethyl ether and diethylene glycol dimethyl ether; sulfoxides such as dimethyl sulfoxide; and ketones such as acetone and methyl ethyl ketone.

The hydrogenated block copolymer (A) can be obtained by subjecting the block copolymer (A) to a hydrogenation reaction. Examples of the method of subjecting the unhydrogenated block copolymer (A) to a hydrogenation reaction include a method in which a mixture obtained by isolating an unhydrogenated block copolymer (A) from the reaction liquid containing the produced block copolymer (A) and dissolving the isolated unhydrogenated block copolymer (A) in a solvent inert to a hydrogenation catalyst or an unhydrogenated block copolymer (A) in the reaction liquid is reacted with hydrogen in the presence of a hydrogenation catalyst. The hydrogenation rate is preferably 80 mol % or more, more preferably 85 mol % or more, further preferably 88 mol % or more, and particularly preferably 90 mol % or more.

Examples of the hydrogenation catalyst include Raney nickel; heterogeneous catalysts in which a metal such as Pt, Pd, Ru, Rh, and Ni is supported on a carrier such as carbon, alumina, and diatomaceous earth; Ziegler catalysts composed of a combination of a transition metal compound and an alkylaluminum compound, an alkyllithium compound or the like; and metallocene catalysts. The hydrogenation reaction can usually be performed under conditions of a hydrogen pressure of 0.1 MPa or more and 20 MPa or less, a reaction temperature of 20° C. or more and 250° C. or less, and a reaction time of 0.1 hour or more and 100 hours or less.

The resin material constituting each A layer has a peak at which a tan δ measured by performing the complex shear viscosity test under the condition of a frequency of 1 Hz according to JIS K 7244-10: 2005 is maximum in a range of −30° C. or more and 10° C. or less. When the tan δ peak temperature is in a range of less than −30° C., the sound insulation in a frequency range of 5,000 Hz to 10,000 Hz is significantly reduced. Meanwhile, when the tan δ peak temperature is in a range of more than 10° C., the sound insulation in a medium frequency range of 2,000 Hz to 5,000 Hz is significantly reduced. Here, tan δ is also refereed to as loss tangent, and is obtained by dividing the shear loss elastic modulus by the shear storage elastic modulus. It is expected that the higher this value, the higher the sound insulation. Tan δ can be measured by the method described in Examples below.

In the present invention, the tan δ peak temperatures of the resin material constituting the A layer is preferably −25° C. or more, more preferably −20° C. or more, preferably 0° C. or less, and more preferably −5° C. or less. When the tan δ peak temperature is within the range between the lower limit and the upper limit, good sound insulation in a frequency range from 2,000 Hz to 10,000 Hz tends to be obtained.

Examples of the method of adjusting the tan δ peak temperature include a method of adjusting the content of the polymer block (a) of a hard segment in the block copolymer (A), or adjusting the type or binding form of the monomer constituting the polymer block (a) of a hard segment or the polymer block (b) of a soft segment, or the glass transition temperature or the like of each segment itself. Specifically, for example, the tan δ peak temperature can be adjusted (increased) by reducing the content of the polymer block (a) in block copolymer (A), or increasing the vinyl bond content, for example, by changing the type or combination of the monomer constituting the polymer block (b).

In the present invention, the tan δ peak height of the resin material of at least one layer of the A layers is 1.5 or more, the tan δ peak height of the resin materials of at least two layers of the A layers is preferably 1.5 or more, and the tan δ peak height of the resin materials of all of the A layers is more preferably 1.5 or more. When the tan δ peak height of all of the resin materials of the A layers is less than 1.5, that is, when no A layer has a tan δ peak height of the resin material of 1.5 or more, the desired sound insulation is not obtained. The tan δ peak height is preferably 2.0 or more, more preferably 2.2 or more, and particularly preferably 2.4 or more. The upper limit of the tan δ peak height is not particularly limited. The tan δ peak height is usually 5.0 or less.

Examples of the method of increasing the tan δ peak height include forming a microphase-separated structure having a sphere structure and increasing the vinyl bond content in the polymer block (b).

The resin material constituting the A layer preferably has a tensile storage elastic modulus at 0° C. measured by performing the dynamic viscoelasticity test under a condition of a frequency of 0.3 Hz according to JIS K 7244-4: 1999 of less than 1.0 GPa.

The resin material constituting the A layer preferably contains the hydrogenated block copolymer (A) as the first thermoplastic resin in an amount of 60% by mass or more, more preferably 70% by mass or more, and further preferably 80% by mass or more based on the total mass of the resin material. The resin material constituting the A layer can contain, in addition to the hydrogenated block copolymer (A), as needed, and as long as the effect of the present invention is not impaired, other thermoplastic resins (for example, additives such as a crystal nucleating agent; hydrogenated resins such as a hydrogenated kumaron inden resin, a hydrogenated rosin resin, a hydrogenated terpene resin, and an alicyclic hydrogenated petroleum resin; adhesive-imparting resins such as aliphatic resin composed of olefin and diolefin polymer; and hydrogenated polyisoprene, hydrogenated polybutadiene, butyl rubber, polyisobutylene, polybutene, polyolefin elastomer, specifically, ethylene-propylene copolymer, ethylene-butylene copolymer, propylene-butylene copolymer, polyolefin resin, olefin polymer, and polyethylene resin). Particularly preferably, the resin material constituting the A layer are composed of the hydrogenated block copolymer (A) as the first thermoplastic resin.

In the interlayer film for a laminated glass of the present invention, the thickness of one A layer is preferably 50 μm or more and 450 μm or less. The optimum thickness of the A layer varies depending on the thicknesses of other layers constituting the interlayer film (for example, the B layer and the C layer described later), the storage elastic modulus of each layer and the like. As the A layer becomes thicker, while the sound insulation becomes higher, the storage elastic modulus of the whole interlayer film tends to decrease. Thus, when the thickness of one A layer is more than 450 μm, the frequency range where the coincidence effect of the laminated glass occurs tends to be more than 6,000 Hz, and the decrease in sound insulation in a frequency range of 6,000 Hz or more may become significant. From the viewpoint of further increasing the sound insulation in the high frequency range, the thickness of one A layer is more preferably 350 μm or less, and particularly preferably 300 μm or less. When the thickness of the A layer is less than 50 μm, the storage elastic modulus may become high, and the frequency range where the coincidence effect occurs may be in the medium frequency range. Thus, the decrease in sound insulation in a medium frequency range of 4,000 to 6,000 Hz may become significant. In particular, sound insulation in this frequency range is practically important, and the improving effect of sound insulation also decreases as the thickness of the A layer decreases. Thus, the thickness of one A layer is more preferably 70 μm or more, particularly preferably 90 μm or more, and further preferably 110 μm or more. The total thickness of the multiple A layers is preferably 950 μm or less, and more preferably 700 μm or less. The thicknesses of each of the multiple A layers can be the same or different. The thickness can be measured with a thickness gauge. The multiple A layers can be composed of the same resin material or different resin materials.

To the resin material constituting the A layer, an antioxidant, an ultraviolet absorber, a light stabilizer, an antiblocking agent, a pigment, a dye, a heat shield material as described below or the like can be added as other components, as needed. In the interlayer film for a laminated glass of the present invention, these additives can be contained in one or more layers selected from the group consisting of multiple A layers, one B layer or multiple B layers, and one C layer or multiple C layers. When the additives are contained in two or more layers selected from the above-mentioned group, those layers can contain the same additive or different additives.

Examples of the antioxidant include a phenol-based antioxidant, a phosphorus-based antioxidant, and a sulfur-based antioxidant.

Examples of the phenol-based antioxidant include acrylate compounds such as 1,3,5-tris(4-tert-butyl-3-hydroxy-2,6-dimethylbenzyl)-1,3,5-triazine-2,4,6-(1H,3H,5H)-trione, 2-t-butyl-6-(3-t-butyl-2-hydroxy-5-methylbenzyl)-4-methylphenylacrylate, and 2,4-di-t-amyl-6-(1-(3,5-di-t-amyl-2-hydroxyphenyl)ethyl)phenyl acrylate, alkyl-substituted phenol-based compounds such as 2,6-di-t-butyl-4-methylphenol, 2,6-di-t-butyl-4-ethylphenol, octadecyl-3-(3,5-)di-t-butyl-4-hydroxyphenyl)propionate, 2,2'-methylene-bis(4-methyl-6-t-butylphenol), 4,4'-butylidine-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5.5]undecane, 1,1,3-tris(2-methyl-4-hydroxy-5-t-butylphenyl)butane, 1,3,5- trimethyl-2,4,6-tris(3,5-di-t-butyl-4-hydroxybenzyl)benzene, tetrakis(methylene-3-(3',5'-di-t-butyl-4'-hydroxyphenyl)propionate)methane, and triethylene glycol bis(3-(3-t-butyl-4-hydroxy-5-methylphenyl)propionate), and triazine group-containing phenol-based compounds such as 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine, and 2-octylthio-4,6-bis-(3,5-di-t-butyl-4-oxyanilino)-1,3,5-triazine.

Examples of the phosphorus-based antioxidant include monophosphite-based compounds such as tris(2,4-di-t-butylphenyl)phosphate, triphenylphosphite, diphenylisodecylphosphite, phenyldiisode, cylphosphite, tris(nonylphenyl)phosphite, tris(dinonylphenyl)phosphite, tris(2-t-butyl-4-methylphenyl)phosphite, tris(cyclohexylphenyl)phosphite, 2,2-methylenebis(4,6-di-t-butylphenyl)octylphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene, and diphosphite-based compounds such as 4,4'-butylidene-bis(3-methyl-6-t-butylphenyl-di-tridecylphosphite), 4,4'-isopropylidene-bis(phenyl-di-alkyl($C_{12}$ to $C_{15}$)phosphite)4,4'-isopropylidene-bis(diphenylmonoalkyl($C_{12}$ to $C_{15}$)phosphite), 1,1,3-tris(2-methyl-4-di-tridecylphosphite-5-t-butylphenyl)butane, and tetrakis(2,4-di-t-butylphenyl)-4,4'-biphenylene phosphite. Among these, monophosphite-based compounds are preferable.

Examples of the sulfur-based antioxidant include dilauryl 3,3'-thiodipropionate, distearyl 3,3-thiodipropionate, laurylstearyl 3,3'-thiodipropionate, pentaerythritol-tetrakis-($\beta$-lauryl-thiopropionate), and 3,9-bis(2-dodecylthioethyl)-2,4,8,10-tetraoxaspiro[5.5]undecane.

The addition amount of the antioxidant is preferably 0.001 parts by mass or more, more preferably 0.01 parts by mass or more, preferably 5 parts by mass or less, and more preferably 1 part by mass or less relative to 100 parts by mass of the first thermoplastic resin. When the amount of the antioxidant is not less than the lower limit and not more than the upper limit, a sufficient antioxidant effect can be imparted.

Examples of the ultraviolet absorber include a benzotriazole ultraviolet absorber, a hindered amine ultraviolet absorber, a benzoate ultraviolet absorber, a triazine-based compound, a benzophenone-based compound, a malonic ester-based compound, an indole-based compound, and an anilide oxalate-based compound. One ultraviolet absorber can be used alone, or two or more ultraviolet absorbers can be used in combination.

In one embodiment of the present invention, at least one layer in the interlayer film for a laminated glass preferably contains an ultraviolet absorber. In this embodiment, the ultraviolet absorber is preferably at least one selected from the group consisting of a benzotriazole-based compound, a benzophenone-based compound, a triazine-based compound, a hindered amine-based compound, a benzoate-based compound, a malonic ester-based compound, an indole-based compound, and an anilide oxalate-based compound.

The addition amount of the ultraviolet absorber is preferably 10 ppm or more, more preferably 100 ppm or more, preferably 50,000 ppm or less, and more preferably 10,000 ppm or less based on the mass of the first thermoplastic resin. When the addition amount of the ultraviolet absorber is within the range between the lower limit and the upper limit, a sufficient ultraviolet absorbing effect can be expected.

Examples of the light stabilizer include a hindered amine light stabilizer.

Examples of the antiblocking agent include inorganic particles and organic particles. Examples of the inorganic particles include oxides, hydroxides, sulfides, nitrates, halides, carbonates, sulfates, acetates, phosphates, phosphites, organic carboxylates, silicates, titanates, and borates of Group IA elements, Group IIA elements, Group IVA elements, Group VIA elements, Group VIIA elements, Group VIIIA elements, Group IB elements, Group IIB elements, Group IIIB elements, and Group IVB elements, and hydrates thereof; and composite compounds and natural mineral particles containing them as a principal component. The principal component is a component having the highest content. Examples of the organic particles include a fluororesin, a melamine resin, a styrene-divinylbenzene copolymer, an acrylic resin silicone, and crosslinked products thereof.

By containing the heat shield material in the interlayer film for a laminated glass, a heat shield function can be imparted to the interlayer film for a laminated glass, and the transmittance of near-infrared light having a wavelength of about 1,500 nm in the laminated glass can be reduced.

Examples of the heat shield material include heat ray shielding particles having a heat my shielding function, and a material of a resin or a glass containing an organic dye compound having a heat my shielding function. Examples of the particles having a heat ray shielding function include oxide particles such as tin-doped indium oxide, antimony-doped tin oxide, aluminum-doped zinc oxide, tin-doped zinc oxide, and silicon-doped zinc oxide, and inorganic material particles having a heat ray shielding function such as $LaB_6$ (lanthanum hexaboride) particles. Examples of the organic dye compound having a heat ray shielding function include diimonium-based dye, aminium-based dye, phthalocyanine-based dye, anthraquinone-based dye, polymethine-based dye, a benzenedithiol-type ammonium-based compound, a thiourea derivative, and a thiol metal complex. One heat shield material can be used alone, or two or more heat shield materials can be used in combination.

In one embodiment of the present invention, at least one layer in the interlayer film for a laminated glass preferably contains a heat shield material. In this embodiment, the heat shield material is preferably at least one selected from the group consisting of tin-doped indium oxide, antimony-doped tin oxide, zinc antimonate, metal-doped tungsten oxide, diimonium-based dye, aminium-based dye, phthalocyanine-based dye, anthraquinone-based dye, polymethine-based dye, a benzenedithiol-type ammonium-based compound, a thiourea derivative, thiol metal complex, aluminum-doped zinc oxide, tin-doped zinc oxide, silicon-doped zinc oxide, lanthanum hexaboride, and vanadium oxide.

When heat ray shielding particles are used as the heat shield material, the content is preferably 0.01% by mass or more, more preferably 0.05% by mass or more, further preferably 0.1% by mass or more, particularly preferably 0.2% by mass or more, preferably 5% by mass or less, and more preferably 3% by mass or less. In the present invention, the heat shield material can be contained in any of the A layer, the B layer described later, the C layer described later (when the third thermoplastic resin is contained), and the D layer described below when it is present, and the "content" means the amount in a case where the total mass of all of the resin materials constituting the A layer, the B layer, the C layer (when the third thermoplastic resin is contained), and the D layer when it is present is 100% by mass. The "content" of the organic dye compound described later has the same meaning. When the content of the heat ray shielding particles is within the range between the lower limit and the upper limit, the transmittance of the near-infrared light having a wavelength of about 1,500 nm can be effectively reduced without affecting the transmittance of visible light of the laminated glass comprising the obtained interlayer film. From the viewpoint of transparency of the interlayer film, the average particle diameter of the heat ray shielding particles is preferably 100 nm or less, and more preferably 50 nm or less. The average particle diameter is the average particle diameter measured by a laser diffractometer.

When an organic dye compound is used as the heat shield material, the content is preferably 0.001% by mass or more, more preferably 0.005% by mass or more, further preferably 0.01% by mass or more, preferably 1% by mass or less, and more preferably 0.5% by mass or less. When the content of the organic dye compound is within the range between the lower limit and the upper limit, the transmittance of the near-infrared light having a wavelength of about 1,500 nm can be effectively reduced without affecting the transmittance of visible light of the laminated glass comprising the obtained interlayer film.

<B Layer>

The interlayer film for a laminated glass of the present invention preferably comprises the B layer at least on the side that comes into contact with a glass, and the B layer is preferably a layer having adhesiveness to a glass. When a layer containing a thermoplastic resin such as an acrylic resin, a polycarbonate resin, or a polyester resin is used as the C layer instead of the inorganic glass, the B layer does not necessarily need to be provided between the A layer and the C layer. However, the B layer can be provided.

The B layer is a layer containing the second thermoplastic resin, and is constituted of the resin material different from the resin material constituting the A layer. The expression "the resin material different from the resin material constituting the A layer" means a resin material other than the same resin material as the resin material constituting the A layer. For example, even in a case where the first thermoplastic resin contained in the A layer and the second thermoplastic resin contained in the B layer are both polyvinyl butyral resins, when the resin material constituting the A layer are not the same as the resin material constituting the B layer, it can be said that the B layer is constituted of the resin material different from the resin material constituting the A layer. Specifically, for example, it is possible that the resin material constituting the A layer is a resin material composed of 50 to 65% by mass of polyvinyl butyral resin $X_1$ and 35 to 50% by mass of plasticizer $Y_1$, and the resin material constituting the B layer is a resin material composed of 70 to 90% by mass of polyvinyl butyral resin $X_1$ and 10 to 30% by mass of plasticizer $Y_1$. For example, it is possible that the resin material constituting the A layer is a resin material composed of polyvinyl butyral resin $X_2$ having 1 to 10 mol % of a vinyl alcohol unit, and the resin material constituting the B layer is a resin material composed of polyvinyl butyral resin $X_3$ having 10.1 to 30 mol % of a vinyl alcohol unit.

From the viewpoint of avoiding the change in sound insulation properties caused by the change in the content of a plasticizer in each layer due to the migration of a plasticizer between adjacent layers depending on the temperature, the A layers or the B layer is preferably constituted of a resin material substantially free of a plasticizer. For example, in the resin material constituting the A layers or the B layer, the content of the plasticizer is preferably 10% by mass or less, 5% by mass or less, 1% by mass or less, or 0% by mass.

The resin material constituting the B layer is composed of the second thermoplastic resin or a resin composition containing the second thermoplastic resin. The B layer preferably contains a polyvinyl acetal resin or an ionomer resin as the second thermoplastic resin. When the B layer contains the polyvinyl acetal resin or the ionomer resin, the glass scattering property at the time of breakage of the laminated glass produced using the interlayer film for a laminated glass of the present invention tends to be low.

When a polyvinyl acetal resin is used as the second thermoplastic resin, the acetalization degree of the polyvinyl acetal resin is preferably 40 mol % or more, more preferably 60 mol % or more, preferably 90 mol % or less, more preferably 85 mol % or less, and further preferably 80 mol % or less. The acetalization degree is an amount of an acetal-forming unit on the basis of one repeating unit which is a unit consisting of two carbons of the main chain in the polyvinyl alcohol-based resin as a raw material of the polyvinyl acetal resin (for example, a vinyl alcohol unit, a vinyl acetate unit, an ethylene unit and the like). From the viewpoint of process, the acetalization degree is preferably within the range between the lower limit and the upper limit, because, in such a case, the compatibility between the polyvinyl acetal resin and the plasticizer tends to be good, and a resin material containing the polyvinyl acetal resin and the plasticizer can be easily obtained. The acetalization degree of the polyvinyl acetal resin is preferably 65 mol % or more from the viewpoint of water resistance. The acetalization degree can be adjusted by adjusting the amount of an aldehyde used in the acetalization reaction.

The content of the vinyl acetate unit in the polyvinyl acetal resin is preferably 30 mol % or less, and more preferably 20 mol % or less. The content of the vinyl acetate unit is an amount of a vinyl acetate unit on the basis of one repeating unit which is a unit consisting of two carbons of the main chain in the polyvinyl alcohol-based resin as a raw material of the polyvinyl acetal resin (for example, a vinyl alcohol unit, a vinyl acetate unit, an ethylene unit and the like). When the content of the vinyl acetate unit is not more than the upper limit, blocking is unlikely to occur during the production of the polyvinyl acetal resin, and the production can become easy. The lower limit of the content of the vinyl acetate unit is not particularly limited. The content of the vinyl acetate unit is usually 0.3 mol % or more. The content of the vinyl acetate unit can be adjusted by appropriately adjusting the degree of saponification of the polyvinyl alcohol-based resin as a raw material.

The content of the vinyl alcohol unit of the polyvinyl acetal resin is preferably 5 mol % or more, more preferably 10 mol % or more, further preferably 15 mol % or more, preferably 35 mol % or less, more preferably 30 mol % or less, further preferably 25 mol % or less, and particularly preferably 20 mol % or less. The content of the vinyl alcohol unit is an amount of a vinyl alcohol unit on the basis of one repeating unit which is a unit consisting of two carbons of the main chain in the polyvinyl alcohol-based resin as a raw material of the polyvinyl acetal resin (for example, a vinyl alcohol unit, a vinyl acetate unit, an ethylene unit and the like). When the content of the vinyl alcohol unit is not less than the lower limit, in a case where a compound having a hydroxyl group as described later is used as the plasticizer, the interaction (hydrogen bond) between the hydroxyl group of the plasticizer and the polyvinyl acetal resin can be sufficiently exhibited, as a result, the compatibility between the polyvinyl acetal resin and the plasticizer tends to become good, and the plasticizer is less likely to migrate to other layers. When the content of the vinyl alcohol unit is not more than the upper limit, the penetration resistance or impact resistance function required for the interlayer film as a safety glass can be suitably controlled. The content of the vinyl alcohol unit can be adjusted by adjusting the amount of an aldehyde used in the acetalization reaction.

The polyvinyl acetal resin is usually composed of an acetal-forming unit, a vinyl alcohol unit, and a vinyl acetate unit, and the amount of each unit is measured by, for example, JIS K 6728 "Testing method for polyvinyl butyral" or nuclear magnetic resonance (NMR).

Only one polyvinyl acetal resin can be used alone, or two or more polyvinyl acetal resins having different acetalization degrees, viscosity-average polymerization degrees or the like can be used in combination.

The polyvinyl acetal resin can be produced by a conventionally publicly-known method. Typically, it can be produced by acetalizing a polyvinyl alcohol-based resin (for example, a polyvinyl alcohol resin or an ethylene vinyl alcohol copolymer) with an aldehyde. Specifically, for example, a polyvinyl alcohol-based resin is dissolved in warm water, the obtained aqueous solution is maintained at a predetermined temperature (for example, 0° C. or more, preferably 10° C. or more, for example 90° C. or less, preferably 20° C. or less), the required acid catalyst and aldehyde are added, and the acetalization reaction is proceeded while stirring. Then, the reaction temperature is increased to about 70° C. for aging to complete the reaction, and then neutralization, washing with water, and drying are performed to obtain a polyvinyl acetal resin powder.

The viscosity-average polymerization degree of the polyvinyl alcohol-based resin, which is a raw material of the polyvinyl acetal resin is preferably 100 or more, more preferably 300 or more, more preferably 400 or more, further preferably 600 or more, particularly preferably 700 or more, and most preferably 750 or more. When the viscosity-average polymerization degree of the polyvinyl alcohol-based resin is too low, the penetration resistance and the creep resistance, particularly the creep resistance under high temperature and high humidity conditions such as 85° C. and 85% RH may decrease. The viscosity-average polymerization degree of the polyvinyl alcohol-based resin is preferably 5,000 or less, more preferably 3,000 or less, further preferably 2,500 or less, particularly preferably 2,300 or less, and most preferably 2,000 or less. When the viscosity-average polymerization degree of the polyvinyl alcohol-based resin is too high, the molding of the B layer may be difficult.

Further, to improve the laminating suitability of the obtained interlayer film for a laminated glass and obtain a laminated glass having a better appearance, the viscosity-average polymerization degree of the polyvinyl alcohol-based resin is preferably 1,500 or less, more preferably 1,100 or less, and further preferably 1,000 or less.

The preferable value of the viscosity-average polymerization degree of the polyvinyl acetal resin is the same as the preferable value of the viscosity-average polymerization degree of the polyvinyl alcohol-based resin.

To set the amount of the vinyl acetate unit of the obtained polyvinyl acetal resin to 30 mol % or less, a polyvinyl alcohol-based resin having a degree of saponification of 70 mol % or more is preferably used. When the degree of saponification of the polyvinyl alcohol-based resin is not less than the lower limit, the transparency and heat resistance of the resin tend to be excellent, and the reactivity with an aldehyde is good. The degree of saponification is more preferably 95 mol % or more.

The viscosity-average polymerization degree and the degree of saponification of the polyvinyl alcohol-based resin can be measured based on, for example, JIS K 6726 "Testing method for polyvinyl alcohol".

As the aldehyde used for acetalization of the polyvinyl alcohol-based resin, an aldehyde having 1 or more and 12 or less carbon atoms is preferable. When the carbon number of the aldehyde is within the above-mentioned range, the reactivity of acetalization is good, block of the resin is less likely to occur during the reaction, and the polyvinyl acetal resin can be easily synthesized.

The aldehyde is not particularly limited, and examples thereof include aliphatic, aromatic, or alicyclic aldehydes such as formaldehyde, acetaldehyde, propionaldehyde, n-butyraldehyde, isobutyraldehyde, valeraldehyde, n-hexylaldehyde, 2-ethylbutyraldehyde, n-heptylaldehyde, n-octylaldehyde, n-nonylaldehyde, n-decylaldehyde, benzaldehyde, and cinnamaldehyde. Among these, aliphatic aldehydes having 2 or more and 6 or less carbon atoms are preferable, and n-butyraldehyde is particularly preferable. Only one aldehyde can be used alone, or two or more aldehydes can be used in combination. Further, polyfunctional aldehydes, other aldehydes having a functional group or the like can be used in combination in small amount within a range of 20% by mass or less of the total aldehyde.

As the polyvinyl acetal resin, a polyvinyl butyral resin is most preferable. As the polyvinyl butyral resin, a modified polyvinyl butyral resin obtained by butyralization of a polyvinyl alcohol polymer obtained by saponification of a copolymer of a vinyl ester and another monomer with butyraldehyde can be used. Examples of another monomer include ethylene, propylene, and styrene. As another monomer, a monomer having a hydroxyl group, a carboxyl group, or a carboxylate group can be used.

When the B layer contains the polyvinyl butyral resin as the second thermoplastic resin, the B layer can further contain a plasticizer. The plasticizer is not particularly limited. As the plasticizer, carboxylic acid ester-based plasticizers such as a monovalent carboxylic acid ester-based plasticizer and a polyvalent carboxylic acid ester-based plasticizer; polymer plasticizers such as a phosphoric acid ester-based plasticizer or a phosphorous acid ester-based plasticizer, a carboxylic acid polyester-based plasticizer, a carbonate polyester-based plasticizer, and a polyalkylene glycol-based plasticizer, or ester compounds of a hydroxycarboxylic acid with a polyhydric alcohol such as castor oil; and hydroxycarboxylic acid ester-based plasticizers such as an ester compound of a hydroxycarboxylic acid with a monohydric or polyhydric alcohol can also be used. Only one plasticizer can be used alone, or two or more plasticizers can be used in combination.

Examples of the monovalent carboxylic acid ester-based plasticizer include compounds obtained by condensation reaction between monovalent carboxylic acids such as butanoic acid, isobutanoic acid, hexane acid, 2-ethylbutanoic acid, heptanoic acid, octyl acid, 2-ethylhexanoic acid, and lauric acid, and polyhydric alcohols such as ethylene glycol, diethylene glycol, triethylene glycol, tetraethylene glycol, polyethylene glycol, polypropylene glycol, and glycerin. Specific examples of the compounds include triethylene glycol di-2-diethylbutanoate, triethylene glycol diheptanoate, triethylene glycol di-2-ethylhexanoate, triethylene glycol dioctanoate, tetraethylene glycol di-2-ethylbutanoate, tetraethylene glycol diheptanoate, tetraethylene glycol di-2-ethylhexanoate, tetraethylene glycol dioctanoate, diethylene glycol di-2-ethylhexanoate, PEG #400 di-2-ethylhexanoate, triethylene glycol mono 2-ethylhexanoate, and a completely or partially esterified product of glycerin or diglycerin with 2-ethylhexanoic acid. PEG #400 represents polyethylene glycol having an average molecular weight of 350 to 450.

Examples of the polyvalent carboxylic acid ester-based plasticizer include compounds obtained by condensation reaction between polyvalent carboxylic acids such as adipic acid, succinic acid, azelaic acid, sebacic acid, phthalic acid, isophthalic acid, terephthalic acid, and trimetic acid, and alcohols having 1 to 12 carbon atoms such as methanol, ethanol, butanol, hexanol, 2-ethylbutanol, heptanol, octanol, 2-ethylhexanol, decanol, dodecanol, butoxyethanol, butoxyethoxyethanol, and benzyl alcohol. Specific examples of the compounds include dihexyl adipate, di-2-ethylbutyl adipate, diheptyl adipate, dioctyl adipate, di-2-ethylhexyl adipate, di(butoxyethyl) adipate, di(butoxyethoxyethyl) adipate, mono(2-ethylhexyl) adipate, dibutyl sebacate, dihexyl sebacate, di-2-ethylbutyl sebacate, dibutyl phthalate, dihexyl phthalate, di(2-ethylbutyl) phthalate, dioctyl phthalate, di(2-ethylhexyl) phthalate, benzylbutyl phthalate, and didodecyl phthalate.

Examples of the phosphoric acid ester-based plasticizer or the phosphorous acid ester-based plasticizer include compounds obtained by condensation reaction between phosphoric acid or phosphorous acid and alcohols having 1 to 12 carbon atoms such as methanol, ethanol, butanol, hexanol, 2-ethylbutanol, heptanol, octanol, 2-ethylhexanol, decanol, dodecanol, butoxyethanol, butoxyethoxyethanol, and benzyl alcohol. Specific examples of the compounds include trimethyl phosphate, triethyl phosphate, tripropyl phosphate, tributyl phosphate, tri(2-ethylhexyl) phosphate, tri(butoxyethyl) phosphate, and tri(2-ethylhexyl) phosphite.

Examples of the carboxylic acid polyester-based plasticizer include carboxylic acid polyesters obtained by alternating copolymerization of polyvalent carboxylic acids such as oxalic acid, malonic acid, succinic acid, adipic acid, suberic acid, sebacic acid, dodecanedioic acid, 1,2-cyclohexanedicarboxylic acid, 1,3-cyclohexanedicarboxylic acid, and 1,4-cyclohexanedicarboxylic acid, with polyhydric alcohols such as ethylene glycol, diethylene glycol, triethylene glycol, tetraethylene glycol, 1,2-propylene glycol, 1,3-propylene glycol, 1,2-butylene glycol, 1,3-butylene glycol, 1,4-butylene glycol, 1,2-pentanediol, 1,5-pentanediol, 2,4-pentanediol, 1,2-hexanediol, 1,6-hexanediol, 3-methyl-1,5-pentanediol, 3-methyl-2,4-pentanediol, 1,2-heptanediol, 1,7-heptanediol, 1,2-octanediol, 1,8-octanediol, 1,2-nonanediol, 1,9-nonanediol, 2-methyl-1,8-octanediol, 1,2-decanediol, 1,10-decanediol, 1,2-dodecanediol, 1,12-dodecanediol, 1,2-cyclohexanediol, 1,3-cyclohexanediol, 1,4-cyclohexanediol, 1,2-bis(hydroxymethyl)cyclohexane, and 1,3-bis(hydroxymethyl)cyclohexane, and 1,4-bis(hydroxymethyl)cyclohexane; polymers of hydroxycarboxylic acid (hydroxycarboxylic acid polyester) such as aliphatic hydroxycarboxylic acids (for example, glycolic acid, lactic acid, 2-hydroxybutyric acid, 3-hydroxybutyric acid, 4-hydroxybutyric acid, 6-hydroxyhexanoic acid, 8-hydroxyhexanoic acid, 10-hydroxydecanoic acid, and 12-hydroxydodecanoic acid) and aromatic ring-containing hydroxycarboxylic acid [for example, 4-hydroxybenzoic acid and 4-(2-hydroxyethyl)benzoic acid]; and carboxylic acid polyesters obtained by ring-opening polymerization of lactone compounds such as aliphatic lactone compounds (for example, γ-butyrolactone, γ-valerolactone, δ-valerolactone, β-methyl-δ-valerolactone, δ-hexanolactone, ε-caprolactone, and lactide) and aromatic ring-containing lactone compounds (for example, phthalide). The terminal structure of the carboxylic acid polyester is not particularly limited, and can be a hydroxyl group or a carboxyl group, an ester bond formed by reacting the terminal hydroxyl group with a monovalent carboxylic acid, or an ester bond formed by reacting the terminal carboxyl group with a monohydric alcohol.

Examples of the polyester carbonate plasticizer include carbonate polyesters obtained by alternating copolymerization through ester exchange reaction of polyhydric alcohols such as ethylene glycol, diethylene glycol, triethylene glycol, tetraethylene glycol, 1,2-propylene glycol, 1,3-propylene glycol, 1,2-butylene glycol, 1,3-butylene glycol, 1,4-butylene glycol, 1,2-pentanediol, 1,5-pentanediol, 2,4-pentanediol, 1,2-hexanediol, 1,6-hexanediol, 3-methyl-1,5-pentanediol, 3-methyl-2,4-pentanediol, 1,2-heptanediol, 1,7-heptanediol, 1,2-octanediol, 1,8-octanediol, 1,2-nonanediol, 1,9-nonanediol, 2-methyl-1,8-octanediol, 1,2-decanediol, 1,10-decanediol, 1,2-dodecanediol, 1,12-dodecanediol, 1,2-cyclohexanediol, 1,3-cyclohexanediol, 1,4-cyclohexanediol, 1,2-bis(hydroxymethyl)cyclohexane, 1,3-bis(hydroxymethyl)cyclohexane, and 1,4-bis(hydroxymethyl))cyclohexane with carbonate esters such as dimethyl carbonate and diethyl carbonate. The terminal structure of the carbonate polyester compounds is not particularly limited, and is preferably a carbonate ester group or a hydroxyl group.

Examples of the polyalkylene glycol plasticizer include polymers obtained by ring-opening polymerization of alkylene oxides such as ethylene oxide, propylene oxide, butylene oxide, and oxetane, using a monohydric alcohol, a polyhydric alcohol, a monovalent carboxylic acid, or a polyvalent carboxylic acid as an initiator.

Examples of the hydroxycarboxylic acid ester-based plasticizers include monohydric alcohol esters of hydroxycarboxylic acids, for example, methyl ricinoleate, ethyl ricinoleate, butyl ricinoleate, methyl 6-hydroxyhexanoate, ethyl 6-hydroxyhexanoate, and butyl 6-hydroxyhexanoate; polyhydric alcohol esters of hydroxycarboxylic acids, for example, ethylene glycol di(6-hydroxyhexanoic acid) ester, diethylene glycol di(6-hydroxyhexanoic acid) ester, triethylene glycol di(6-hydroxyhexanoic acid) ester, 3-methyl-1,5-pentanediol di(6-hydroxyhexanoic acid) ester, 3-methyl-1,5-pentanediol di(2-hydroxybutyric acid) ester, 3-methyl-1,5-pentanediol di(3-hydroxybutyric acid) ester, 3-methyl-1,5-pentanediol di(4-hydroxybutyric acid) ester, triethylene glycol di(2-hydroxybutyric acid) ester, glycerin tri(ricinoleic acid) ester, and L-tartaric acid di(1-(2-ethylhexyl)); and compounds in which some groups derived from the hydroxycarboxylic acid in castor oil or a polyhydric alcohol ester of a hydroxycarboxylic acid are replaced with groups derived from the carboxylic acid containing no hydroxyl group or with hydrogen atoms. As these hydroxycarboxylic acid esters, those obtained by a conventionally publicly-known method can be used.

The plasticizers are preferably, from the viewpoint of easily increasing the compatibility with polyvinyl butyral resin, or low migration properties or no-migration properties to other layers, ester-based plasticizers or ether-based plasticizers which have a melting point of 30° C. or less and a hydroxyl value of 15 mgKOH/g or more and 450 mgKOH/g or less, or ester-based plasticizers or ether-based plasticizers which are non-crystalline and have a hydroxyl value of 15 mgKOH/g or more and 450 mgKOH/g or less. The "non-crystalline" means that no melting point is observed at a temperature of −20° C. or more. When a melting point is observed, the melting point is preferably 15° C. or less, and particularly preferably 0° C. or less. The hydroxyl value is, regardless of whether the melting point is observed or not observed, more preferably 30 mgKOH/g or more, particularly preferably 45 mgKOH/g or more, more preferably 360 mgKOH/g or less, and particularly preferably 280 mgKOH/g or less. Examples of the ester-based plasticizers include polyesters (such as the carboxylic acid polyester-based plasticizers and carbonate polyester-based plasticizers) and hydroxycarboxylic acid ester compounds (such as the hydroxycarboxylic acid ester-based plasticizers) that satisfy the above-mentioned limitations, and examples of the ether-based plasticizers include polyether compounds that satisfy the above-mentioned limitations (such as the polyalkylene glycol-based plasticizers).

The content of the plasticizer in the B layer is preferably 50 parts by mass or less, more preferably 45 parts by mass or less, and particularly preferably 40 parts by mass or less relative to 100 parts by mass of the polyvinyl acetal resin. When the content of the plasticizer is not more than the upper limit, the laminated glass comprising the obtained interlayer film tends to have excellent impact resistance. The lower limit of the content of the plasticizer is not particularly limited. The content of the plasticizer in the B layer can be, for example, 10 parts by mass or more, 5 parts by mass or more, or 0 parts by mass relative to 100 parts by mass of the thermoplastic resin constituting the B layer.

A compound having a hydroxyl group has high compatibility with a polyvinyl acetal resin and low migration properties to the A layer, and thus the sound insulation of the laminated glass comprising the obtained interlayer film can be stably exhibited. Thus, as the plasticizer, a compound having a hydroxyl group is preferably used. Examples of the plasticizer compound having a hydroxyl group include polyester polyols manufactured by KURARAY CO., LTD "Kuraray Polyol β-510" and "Kuraray Polyol β-1010".

The content of the plasticizer compound having a hydroxyl group based on the total amount of the plasticizer contained in the B layer is preferably 10% by mass or more, more preferably 15% by mass or more, particularly preferably 20% by mass or more, preferably 100% by mass or less, more preferably 90% by mass or less, and particularly preferably 80% by mass or less.

When an ionomer resin is used as the second thermoplastic resin contained in the B layer, the ionomer resin is not particularly limited. Examples of the ionomer resin include resins having a structural unit derived from ethylene and a structural unit derived from α,β-unsaturated carboxylic acid in which at least a part of the structural unit derived from α,β-unsaturated carboxylic acid is neutralized by a metal ion. Examples of the α,β-unsaturated carboxylic acid include acrylic acid, methacrylic acid, maleic acid, monomethyl maleate, monoethyl maleate, and maleic anhydride, and acrylic acid or methacrylic acid is particularly preferable. Examples of the metal ion include sodium ion. In the ethylene-α,β-unsaturated carboxylic acid copolymer as the base polymer, the content of the structural unit derived from the 4-unsaturated carboxylic acid is preferably 2% by mass or more, more preferably 5% by mass or more, preferably 30% by mass or less, and more preferably 20% by mass or less. From the viewpoint of availability, the ionomer resin of ethylene-acrylic acid copolymer and the ionomer resin of ethylene-methacrylic acid copolymer are preferable. Particularly preferable examples of the ethylene ionomer resin include a sodium ionomer resin of ethylene-acrylic acid copolymer and a sodium ionomer resin of ethylene-methacrylic acid copolymer. Only one ionomer resin can be used alone, or two or more ionomer resins can be used in combination.

The B layer can also contain a resin other than the polyvinyl acetal resin and the ionomer resin. From the viewpoint of easily maintaining high adhesiveness to a glass, the content of the polyvinyl acetal resin or the ionomer resin in the resin material constituting the B layer is preferably 40% by mass or more, more preferably 50% by mass or more, more preferably 60% by mass or more, particularly preferably 80% by mass or more, and most preferably 90% by mass or more.

In a preferable embodiment of the interlayer film for a laminated glass of the present invention, the resin material constituting the B layer consists of an ionomer resin. Also, in a case where an ionomer resin is used as the resin material constituting the B layer, by using multiple A layers having excellent sound insulation and defined in the present invention and employing a structure in which the C layer described below is inserted between the multiple A layers, the interlayer film having excellent sound insulation can be obtained.

The resin material constituting the B layer can further contain an antioxidant, an ultraviolet absorber, a light stabilizer, an antiblocking agent, a pigment, a dye, a functional inorganic compound, a heat shield material or the like as other components, as needed.

For the antioxidant, the ultraviolet absorber, the light stabilizer, the antiblocking agent, or the heat shield material, the same materials as those described in the description of the A layer above can be used, and the suitable agents, materials, or addition amounts in the B layer can be the same as or different from the suitable agents, materials, or addition amounts in the A layer.

The B layer can be a layer which controls the adhesiveness of the obtained interlayer film to a glass or the like, as needed. Examples of the method of controlling the adhesiveness include a method of adding an additive used as an adhesiveness regulator for a laminated glass to the resin material constituting the B layer, and a method of adding various additives for adjusting adhesiveness to the resin material constituting the B layer. By such a method, an interlayer film for a laminated glass containing an adhesiveness regulator and/or various additives for adjusting adhesiveness can be obtained.

As the adhesiveness regulator, for example, those disclosed in WO-A-03/033583 can be used. An alkali metal salt or an alkaline earth metal salt is preferably used, and examples thereof include potassium salt, sodium salt, magnesium salt and the like. Examples of the salts include salts of organic acids such as carboxylic acid (for example, octanoic acid, hexanoic acid, butyric acid, acetic acid, and formic acid); and salts of inorganic acids such as hydrochloric acid and nitric acid.

The optimum addition amount of the adhesiveness regulator depends on the adhesiveness regulator used. Generally, the addition amount is preferably adjusted so that the adhesion force of the obtained interlayer film to a glass is 3 or more and 10 or less in Pummel Test (described in WO-A-03/033583 and the like), and is preferably adjusted so that the adhesion force of the obtained interlayer film to a glass is 3 or more and 6 or less particularly when high penetration resistance is required. When a high glass scattering prevention property is required, the adhesion force is preferably adjusted to 7 or more and 10 or less. When a high glass scattering prevention property is required, no addition of an adhesiveness regulator is also a useful method.

The resin material constituting the B layer preferably has a tensile storage elastic modulus at 0° C. measured by performing the dynamic viscoelasticity test under a condition of a frequency of 0.3 Hz according to JIS K 7244-4: 1999 of less than 1.0 GPa.

In the interlayer film for a laminated glass of the present invention, the thickness of one B layer is preferably 100 μm or more, more preferably 150 μm or more, particularly preferably 200 μm or more, preferably 600 μm or less, more preferably 500 μm or less, particularly preferably 350 μm or less, and most preferably 300 μm or less. When the thickness of the B layer is not less than the lower limit, appropriate flexural rigidity tends to be easily imparted to the interlayer film, the decrease in the sound insulation in a high frequency range tends to be easily suppressed, and the sufficient adhesiveness of the B layer to a glass and the like tends to be easily exhibited. When the thickness of the B layer is not more than the upper limit, the thickness of the interlayer film for a laminated glass is not too thick, which is advantageous for reducing the weight of the laminated glass. When multiple B layers are laminated, their thicknesses can be the same or different. The thickness is measured with a thickness gauge.

<C Layer>

The interlayer film for a laminated glass of the present invention comprises the C layer disposed to separate the A layers which are plurally used. The C layer is a layer composed of an inorganic glass having a thickness of 0.1 mm or more and 1.5 mm or less, or a layer having a thickness of 0.25 mm or more and 2.5 mm or less and containing the third thermoplastic resin. When the C layer is the layer containing the third thermoplastic resin, the resin material constituting the C layer has a tensile storage elastic modulus at 0° C. measured by performing the dynamic viscoelasticity test under a condition of a frequency of 0.3 Hz according to JIS K 7244-4:1999 of 1.0 GPa or more. The tensile storage elastic modulus is preferably 1.5 GPa or more, and more preferably 2.0 GPa or more. In the present invention, the C layer has a certain thickness and is composed of a material having a high tensile storage elastic modulus, and a structure in which the C layer is disposed to separate the multiple A layers playing an important role in sound insulation is employed, thereby high sound insulation of the interlayer film is achieved. Generally, the flexural rigidity of a plate-shaped material correlates with a tensile storage elastic modulus and a thickness. It can be thought that the high flexural rigidity of the C layer relates to the exhibition of sound insulation of the multiple A layers, and further leads to exhibition of excellent sound insulation as an interlayer film Thus, when the tensile storage elastic modulus of the C layer is higher, a higher sound insulation can be designed even if the C layer is thin. As a result, the thickness of the laminated glass can be reduced, and weight reduction can be achieved.

When an inorganic glass is used as the C layer, the material of the glass is not particularly limited. Examples of the inorganic glass include soda lime glass, aluminosilicate glass, borosilicate glass, non-alkali glass, and quartz glass. When the thickness of the C layer is 1 mm or less, a glass plate obtained by chemically strengthening a glass such as alkali aluminosilicate glass and alkali aluminoborosilicate glass by an ion exchange process (for example, Gorilla glass manufactured by Corning Incorporated and Dragon Trail manufactured by AGC Inc.) can be used. That is, in one embodiment of the present invention, the inorganic glass is preferably an inorganic glass that is chemically strengthened (hereinafter, may be also referred to as "chemically strengthened inorganic glass").

When the inorganic glass is used for the C layer, the thickness is 0.1 mm or more and 1.5 mm or less. When the thickness of the inorganic glass is less than 0.1 mm, the glass becomes brittle and at the same time, the effect of improving the sound insulation tends to reduce. When the thickness of the inorganic glass is more than 1.5 mm, the thickness of the laminated glass increases and the laminated glass may become heavy, or the frequency range where the coincidence effect occurs becomes low, and thus the sound insulation at a frequency range of 4,000 Hz to 6,000 Hz where human ears are highly sensitive may be deteriorated. The thickness is preferably 0.2 mm or more, more preferably 0.3 mm or more, preferably 1.0 mm or less, more preferably 0.68 mm or less, and further more preferably 0.58 mm or less.

The C layer can be a layer composed of an inorganic glass or a layer containing a third thermoplastic resin. When a thin inorganic glass is used for an interlayer film for a windshield of a vehicle (for example, an automobile), it may be difficult to form a curved surface of the windshield while maintaining high mechanical strength. In such a case, the C layer is preferably the layer containing a third thermoplastic resin. When the C layer is the layer containing a third thermoplastic resin, there is an advantage in production process from the viewpoint that all layers of the interlayer film can be produced at once by coextrusion.

When the C layer is the layer containing a third thermoplastic resin, the resin material constituting the C layer is appropriately selected so that the tensile storage elastic modulus is 1.0 GPa or more. The resin material constituting the C layer is composed of a third thermoplastic resin or a resin composition containing a third thermoplastic resin. As described above, by using a resin material having a high tensile storage elastic modulus, the thickness of the C layer necessary for improving sound insulation can be reduced, the thickness of the interlayer film for a laminated glass or the thickness of laminated glass can be reduced, and weight reduction can be realized. By focusing on the tensile storage elastic modulus at 0° C., the improvement of the sound insulation properties in the medium frequency range can be realized.

As the third thermoplastic resin, for example, polystyrene resin, acrylic resin, phenol resin, vinyl chloride resin, AS resin, polycarbonate resin, polyester resin, ABS resin, acetal resin, polyamide resin, ionomer resin, polyvinyl acetal resin or the like can be used. From the viewpoint of high tensile storage elastic modulus, transparency, cost, or tear resistance of the obtained interlayer film, the C layer preferably contains any of acrylic resin, polycarbonate resin, polyester resin, and polyvinyl acetal resin, as the third thermoplastic resin. When the C layer is the layer containing a third thermoplastic resin, the thickness is 0.25 mm or more and 2.5 mm or less. When the thickness is less than 0.25 mm, the effect of improving the sound insulation tends to decrease. When the thickness is more than 2.5 mm, the thickness of the laminated glass increases and the laminated glass may become heavy, the frequency range where the coincidence effect occurs becomes low, thus the sound insulation at a frequency range of 4,000 Hz to 6,000 Hz where human ears are highly sensitive may be deteriorated, or the C layer may not follow the shape when the C layer is laminated to form a laminated glass. The thickness is preferably 0.4 mm or more, more preferably 0.5 mm or more, preferably 2.2 mm or less, more preferably 1.5 mm or less, and further more preferably 1.0 mm or less.

However, when the interlayer film for a laminated glass has a laminated structure comprising the B layer or the D layer between the A layer and the C layer, the sound insulation may be improved even if the C layer is thin. In this case, including a case where there are multiple B layers in contact with the C layer and a case where there is a D layer, the total thickness of the B layer, the C layer, and the D layer existing between the two A layers is preferably 0.5 mm or more, more preferably 0.8 mm or more, preferably 25 mm or less, more preferably 1.5 mm or less, and further more preferably 1.0 mm or less, and further the thickness of the C layer based on the total thickness of the B layer, the C layer, and the D layer [thickness of C layer/(total thickness of B layer, C layer, and D layer)] is preferably 0.3 or more, more preferably 0.6 or more, and further preferably 0.8 or more.

When the C layer is the layer containing a third thermoplastic resin, the resin material constituting the C layer more preferably has a high tensile storage elastic modulus even on a high temperature side (more than 0° C.) such as 20° C. to 40° C. In such a case, rigidity can be imparted to the interlayer film or the laminated glass, and thus even when a laminated glass is produced using a relatively thin glass, such a laminated glass can be suitably used for a side window or the like. However, in a case where the tensile storage elastic modulus of the resin material constituting the C layer is high, as the thickness increases, wrapping the sheet around a roll becomes harder, or cutting out of the sheet may become difficult. Thus, in a case where the tensile storage elastic modulus on the high temperature side is high, the C layer preferably has a thickness of less than 1.5 mm.

The acrylic resin that can be used as the third thermoplastic resin is not particularly limited as long as it provides a resin material that satisfies the above-mentioned tensile storage elastic modulus.

The acrylic resin is a polymer of one of the monomers as exemplified below, or a copolymer of two or more of the monomers exemplified below: methyl methacrylate, methacrylic acid, acrylic acid, benzyl (meth)acrylate, n-butyl (meth)acrylate, i-butyl (meth)acrylate, t-butyl (meth)acrylate, 2-ethylhexyl (meth)acrylate, lauryl (meth)acrylate, tridecyl (meth)acrylate, stearyl (meth)acrylate, glycidyl (meth) acrylate, hydroxypropyl (meth)acrylate, 2-methoxyethyl (meth)acrylate, 2-ethoxyethyl (meth)acrylate, cyclohexyl (meth)acrylate, isobornyl (meth)acrylate, norbornyl (meth) acrylate, dicyclopentenyl (meth)acrylate, dicyclopentanyl (meth)acrylate, dicyclopentenyloxyethyl (meth)acrylate, tetrahydrofurfuryl (meth)acrylate, acrylic (meth)acrylate, 2-hydroxyethyl (meth)acrylate, 2-(meth)acroyloxyethyl succinate, 2-(meth)acroyloxyethyl maleate, 2-(meta)acroyloxyethyl phthalate, 2-(meth)acrioiloxyethyl hexahydrophthalate, pentamethylpiperidyl (meth)acrylate, tetramethylpiperidyl (meth)acrylate, dimethylaminoethyl (meth)acrylate, diethylaminoethyl (meth)acrylate and the like.

The acrylic resin can further contain a monomer copolymerizable with the above-mentioned monomers as a structural component. Such a copolymerizable monomer can be a monofunctional monomer, that is, a compound having one polymerizable carbon-carbon double bond in the molecule, or can be a polyfunctional monomer, that is, a compound having at least two polymerizable carbon-carbon double bonds in the molecule. When the acrylic resin contains a copolymerizable monomer as a structural component, only one copolymerizable monomer can be contained alone or two or more copolymerizable monomers can be contained.

Examples of the monofunctional monomer include aromatic alkenyl compounds such as styrene, α-methylstyrene, and vinyltoluene; alkenyl cyanides such as acrylonitrile and methacrylnitrile; and acrylic acid, methacrylic acid, maleic anhydride, and N-substituted maleimide. Examples of the polyfunctional monomer include polyunsaturated carboxylic acid esters of a polyhydric alcohol such as ethylene glycol dimethacrylate, butanediol dimethacrylate, and trimethylolpropane triacrylate; alkenyl esters of an unsaturated carboxylic acid such as allyl acrylate, allyl methacrylate, and allyl silicate; polyalkenyl esters of a polybasic acid such as diallyl phthalate, diallyl maleate, triallyl cyanurate, and triallyl isocyanurate; and aromatic polyalkenyl compounds such as divinylbenzene.

From the viewpoint of easily improving the environmental resistance (a warp due to moisture absorption) of the acrylic resin, the acrylic resin is preferably a methyl methacrylate-styrene copolymer. As the methyl methacrylate-styrene copolymer, those having 30 to 95% by mass of methyl methacrylate unit and 5 to 70% by mass of styrene unit based on all the monomer structural units is usually used, those having 40 to 95% by mass of methyl methacrylate unit and 5 to 60% by mass of styrene unit based on all the monomer structural units is preferably used, and those having 50 to 90% by mass of methyl methacrylate unit and 10 to 50% by mass of styrene unit based on all the monomer structural units is more preferably used.

The acrylic resin that can be used in the present invention can be prepared by polymerizing the above-mentioned monomer components by a publicly-known method such as suspension polymerization, emulsion polymerization, and bulk polymerization. At that time, from the viewpoint of easily adjusting the glass transition temperature of the obtained acrylic resin to a desired temperature or from the viewpoint of easily obtaining a viscosity that provides suitable moldability during production of an interlayer film, a chain transfer agent is preferably used during polymerization. The amount of the chain transfer agent can be appropriately determined depending on the type of the monomer component, the composition of the acrylic resin to be prepared, or the like.

The polycarbonate resin that can be used as the third thermoplastic resin is not particularly limited as long as it provides a resin material that satisfies the above-mentioned tensile storage elastic modulus. At least one selected from the group consisting of aromatic polycarbonate, aliphatic polycarbonate, and alicyclic polycarbonate can be used.

Examples of the aromatic polycarbonate include i) those obtained by reacting a dihydric phenol with a carbonylating agent by interfacial polycondensation, melt transesterification method or the like, ii) those obtained by polymerizing a carbonate prepolymer by solid phase transesterification method or the like, and iii) those obtained by polymerizing a cyclic carbonate compound by a ring-opening polymerization. Among these, the aromatic polycarbonate of the above item i) is preferable from the viewpoint of productivity.

Examples of the dihydric phenol used for the preparation of the aromatic polycarbonate of the above item i) include the following compounds, and one of such compounds can be used alone or two or more of such compounds can be used as needed: hydroquinone, resorcinol, 4,4'-dihydroxydiphenyl, bis(4-hydroxyphenyl)methane, bis {(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (commonly known as bisphenol A), 2,2-bis {(4-hydroxy-3-methyl)phenyl}propane, 2,2-bis {(4-hydroxy-3,5-dimethyl)phenyl}propane, 2,2-bis {(4-hydroxy-3,5-dibromo)phenyl}propane, 2,2-bis {(3-isopropyl-4-hydroxy)phenyl}propane, 2,2-bis {(4-hydroxy-3-phenyl)

phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-dlisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, 4,4'-dihydroxydiphenylsulfoxide, 4,4'-dihydroxydiphenylsulfide, 4,4'-dihydroxydiphenylketone, 4,4'-dihydroxydiphenyl ether, and 4,4'-dihydroxydiphenyl ester.

Among these exemplified dihydric phenols, at least one dihydric phenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane, and α,α'-bis(4-hydroxyphenyl)-m-diisopropylbenzene is preferably used. More preferably, bisphenol A is used alone, or a combination of 1,1-bis(4-hydroxyphenyl)-3,3,5-trimethylcyclohexane and bisphenol A with one or more dihydric phenols selected from the group consisting of 2,2-bis {(4-hydroxy-3-methyl)phenyl}propane and α,α'-bis(4-hydroxyphenyl)-m-diisopropylbenzene.

Examples of the carbonylating agent used for the preparation of the aromatic polycarbonate of the above item i) include the following compounds, and one of such compounds can be used alone or two or more of such compounds can be used as needed: carbonyl halides such as phosgene, carbonate esters such as diphenyl carbonate, and haloformates such as dihaloformate of a dihydric phenol.

The polyester resin that can be used as the third thermoplastic resin is not particularly limited as long as it provides a resin material that satisfies the above-mentioned tensile storage elastic modulus. As the polyester resin, a resin composed of a common dicarboxylic acid structural unit and a diol structural unit can be used.

Examples of the monomer suitable for the dicarboxylic acid structural unit include aromatic dicarboxylic acids such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid, and tetralindicarboxylic acid, and ester-forming derivatives thereof; and saturated alicyclic dicarboxylic acids such as succinic acid, glutaric acid, adipic acid, pimelic acid, corkic acid, azelaic acid, sebacic acid, decandicarboxylic acid, dodecandicarboxylic acid, cyclohexanedicarboxylic acid, norbornandicarboxylic acid, tricyclodecanedicarboxylic acid, and pentacyclododecanecarboxylic acid, and ester-forming derivatives thereof. Among these, from the viewpoint of versatility, aromatic dicarboxylic acids and ester-forming derivatives thereof are preferable, and terephthalic acid, isophthalic acid, naphthalenedicarboxylic acid, or ester-forming derivatives thereof is more preferable.

Examples of the monomer suitable for the diol structural unit include aliphatic diols such as ethylene glycol, trimethylene glycol, 1,4-butanediol, 1,5-pentanediol, 1,6-hexanediol, diethylene glycol, propylene glycol, and neopentyl glycol; polyether compounds such as polyethylene glycol, polypropylene glycol, and polybutylene glycol; alicyclic diols such as 1,3-cyclohexanedimethanol, 1,4-cyclohexanedimethanol, 1,2-decahydronaphthalenedimethanol, 1,3-decahydronaphthalenedimethanol, 1,4-decahydronaphthalinedimethanol, 1,5-decahydronaphthalinedimethanol, 1,6-decahydronaphthalineclimethanol, 2,7-decahydronaphthalinedimethanol, tetralindimethanol, norbomenedimethanol, tricyclodecanedimethanol, and pentacyclododecanedimethanol; bisphenols such as 4,4'-(1-methylethylidene) bisphenol, methylene bisphenol (bisphenol F), 4,4'-cyclohexylidene bisphenol (bisphenol Z), and 4,4'-sulfonyl bisphenol (bisphenol S); and alkylene oxide adducts of the above-mentioned bisphenols. In addition, the examples also include aromatic dihydroxy compounds such as hydroquinone, resorcinol, 4,4'-dihydroxybiphenyl, dihydroxydiphenyl ether, and 4,4'-dihydroxydiphenylbenzophenone; alkylene oxide adducts of the aromatic dihydroxy compounds; and diols having a cyclic acetal backbone.

The polyester resin can be produced by a publicly-known method. For example, the polyester resin can be produced by a general method of melt polymerization in which esterification and/or transesterification between a dicarboxylic acid and a diol is performed, and then polycondensation is performed under reduced pressure, or a publicly-known solution-heating dehydration condensation method in which an organic solvent is used.

When a polyvinyl acetal resin is used as the third thermoplastic resin, the polyvinyl acetal resin and the plasticizer described in the description of the B layer above can be similarly used. However, from the viewpoint of easily obtaining a resin layer having a high tensile storage elastic modulus, the content of the plasticizer in the resin material constituting the C layer is preferably 30 parts by mass or less, more preferably 25 parts by mass or less, further preferably 23 parts by mass or less, further more preferably 10 parts by mass or less, particularly preferably 5 parts by mass or less, and most preferably 0 part by mass relative to 100 parts by mass of the polyvinyl acetal resin. The lower limit of the content of the plasticizer in the resin material constituting the C layer is not particularly limited. The content can be 1 part by mass or more.

When the C layer is the layer containing the third thermoplastic resin, the resin material constituting the C layer can further contain an antioxidant, an ultraviolet absorber, a light stabilizer, an antiblocking agent, a pigment, a dye, a functional inorganic compound, a heat shield material, an adhesion force regulator or the like as other components, as needed.

For the antioxidant, the ultraviolet absorber, the light stabilizer, the antiblocking agent, or the heat shield material, the same materials as those described in the description of the A layer or the B layer above can be used, and the suitable agents, materials, or addition amounts in the C layer can be the same as or different from the suitable agents, materials, or addition amounts in the A layer or the B layer.

Examples of the adhesion force regulator include polyolefins having an adhesive functional group such as a carboxyl group, a derivative group of a carboxyl group, an epoxy group, a boronic acid group, a derivative group of a boronic acid group, an alkoxyl group, and a derivative group of an alkoxyl group.

Some heat shield materials undergo deterioration by light due to ultraviolet rays. However, when the C layer is the layer containing the third thermoplastic resin, deterioration of the heat shield material can be suppressed by employing a structure in which the C layer located relatively in the center of an interlayer film cross section contains a large amount of a heat shield material, and the A layer or B layer located outside of the C layer contains a large amount of an ultraviolet absorber.

<Interlayer Film for Laminated Glass>

The method for producing the interlayer film for a laminated glass of the present invention is not particularly limited.

When the C layer is the layer composed of an inorganic glass, for example, an interlayer film for a laminated glass (B layer/A layer/B layer/C layer/B layer/A layer/B layer) can be produced by producing two films of interlayer having a structure in which B layers are laminated on both sides of an A layer (B layer/A layer/B layer), and sandwiching a C layer between them. The film of interlayer can be produced by uniformly kneading the resin material constituting the B layers, then producing the B layers by a publicly-known film forming method (for example, extrusion method, calendar method, pressing method, casting method, or inflation method), producing the A layers from the resin material constituting the A layer by the same method, and laminating them by press molding and the like, or coextruding the B layers and the A layer. A laminated glass can be produced using the interlayer film for a laminated glass of the present invention according to the method for producing a laminated glass described later. When the C layer is the layer composed of an inorganic glass, a laminated glass can be produced by disposing and laminating the produced interlayer film for a laminated glass between two transparent substrates of the outermost layers, or by simultaneously laminating the films of interlayer and the C layer; and the interlayer film for a laminated glass and the transparent substrates of the outermost layers (as a specific example, by disposing the two films of interlayer between two transparent substrates of the outermost layers, further disposing the C layer between the films of interlayer, and then laminating them).

When the C layer is the layer containing the third thermoplastic resin, for example, an interlayer film for a laminated glass can be produced by producing each layer as described above and laminating them, or coextruding them so that the interlayer film for a laminated glass comprises each layer in a desired order (for example, B layer/A layer/C layer/A layer/B layer, B layer/A layer/B layer/C layer/B layer/A layer/B layer or the like).

Among publicly-known film-forming methods, a method of producing a film of interlayer or an interlayer film for a laminated glass using an extruder is preferably employed. The resin temperature (resin material temperature) at the time of extrusion is preferably 150° C. or more, more preferably 170° C. or more, preferably 250° C. or less, and more preferably 230° C. or less. When the resin temperature at the time of extrusion is within the range between the lower limit and the upper limit, the resin and the like contained in the resin material are less likely to be decomposed, thus the resin and the like are less likely to be deteriorated, and the discharge from the extruder tends to be easily stabilized. To efficiently remove the volatile substances, volatile substances are preferably removed from the vent port of the extruder by reduced pressure.

The thickness of each one of the A layers, the B layers, and the C layer is as described above.

Figure 2:
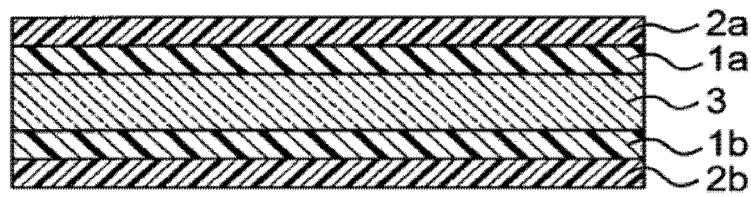
FIG. 2 shows a schematic sectional view showing a structure of one embodiment of an interlayer film for a laminated glass of the present invention.

The laminated structure of the interlayer film for a laminated glass of the present invention is appropriately determined depending on the purpose. The interlayer film for a laminated glass, for example, can have a structure in which two films of interlayer in which an A layer is sandwiched between B layers are laminated so that a C layer is sandwiched between the two films of interlayer (B layer/A layer/B layer/C layer/B layer/A layer/B layer) as shown in FIG. 1. The interlayer film for a laminated glass, for example, can also have a structure as shown in FIG. 2 (B layer/A layer/C layer/A layer/B layer), and in addition, can have a laminated structure having multiple C layers such as B layer/A layer/B layer/C layer/B layer/A layer/B layer/C layer/B layer/A layer/B layer.

In one embodiment of the present invention, the interlayer film for a laminated glass preferably comprises in sequence the A layer, the B layer, the C layer, the B layer, and the A layer, the C layer is directly adjacent to each of the two B layers, and the C layer is the layer composed of an inorganic glass.

In one embodiment of the present invention, the interlayer film for a laminated glass preferably at least comprises in sequence the B layer, the A layer, the C layer, and the A layer. In this embodiment, the C layer is preferably the layer containing the third thermoplastic resin.

The interlayer film for a laminated glass of the present invention can comprise one or more layers other than the A layer, the B layer, and the C layer (referred to as a D layer). Non-limiting examples of a laminated structure in a case where the interlayer film for a laminated glass also comprises a D layer include B layer/A layer/D layer/B layer/C layer/B layer/A layer/B layer, B layer/A layer/B layer/C layer/B layer/A layer/B layer/D layer, B layer/D layer/A layer/D layer/B layer/C layer/B layer/A layer/B layer, B layer/D layer/A layer/B layer/C layer/B layer/A layer/D layer/B layer, B layer/D layer/A layer/B layer/D layer/C layer/B layer/A layer/B layer, B layer/D layer/A layer/B layer/D layer/B layer/C layer/B layer/A layer/B layer/D layer, D layer/B layer/A layer/B layer/C layer/B layer/A layer/B layer/D layer, B layer/A layer/D layer/B layer/D layer/C layer/B layer/A layer/B layer, D layer/B layer/A layer/B layer/D layer/B layer/A layer/D layer/B layer/D layer/C layer/B layer/A layer/B layer, and D layer/B layer/D layer/A layer/D layer/B layer/D layer/C layer/B layer/A layer/B layer. In the laminated structure, when two or more A layers, B layers, C layers and/or D layers are each included, the materials (resin materials in the case of a material containing a resin) constituting each of the A layers, each of the B layers, each of the C layers, or each of the D layers, and the thicknesses of each of the A layers, each of the B layers, each of the C layers, or each of the D layers can be the same of different from each other.

The D layer that can be included in the interlayer film for a laminated glass of the present invention can be a layer composed of a publicly-known resin. As the resin constituting the D layer, for example, polyethylene, polypropylene, polyvinyl chloride, polystyrene, polyvinyl acetate, polyurethane, polytetrafluoroethylene, acrylic resin, polyamide, polyacetal, polycarbonate, polyethylene terephthalate among polyesters, polybutylene terephthalate, cyclic polyolefin, polyphenylene sulfide, polytetrafluoroethylene, polysulfon, polyethersulfon, polyarylate, liquid crystal polymer, polyimide or the like can be used. The D layer can contain additives such as a plasticizer, an antioxidants, an ultraviolet absorber, a light stabilizer, an antiblocking agent, a pigment, a dye, and a heat shield material, as needed, and a layer such as an inorganic multilayer and a metal conductive layer can be formed on at least a part of the D layer.

Irregularities are preferably formed on the surface of the interlayer film for a laminated glass of the present invention by a conventionally publicly-known method such as melt fracture and embossing. The shape of irregularities is not particularly limited, and a conventionally publicly-known one can be employed. When the C layer is the layer composed of an inorganic glass, irregularities are also preferably formed on the layer surface in contact with the C layer.

The thickness of the interlayer film for a laminated glass of the present invention is preferably 08 mm or more, more preferably 11 mm or more, preferably 3.6 mm or less, more preferably 3.2 mm or less, and particularly preferably 2.4 mm or less. When the thickness is preferably not less than the lower limit, a structure of the laminated glass excellent in sound insulation can be easily obtained. When the thickness is preferably not more than the upper limit, the weight of the entire laminated glass can be reduced and the cost of the interlayer film can be easily reduced.

For the interlayer film for a laminated glass of the present invention, a laminated glass obtained by sandwiching the interlayer film for a laminated glass using a float glass having a length of 300 mm, a width of 25 mm, and a thickness of 19 mm and a chemically strengthened inorganic glass having a length of 300 mm, a width of 25 mm, and a thickness of 0.55 mm, and pressure bonding them under the conditions of a temperature of 140° C., a pressure of 1 MPa, and 60 minutes preferably has a loss factor at the third resonance frequency measured by damping test of the laminated glass according to a center excitation method at 20° C. of 0.55 or more, more preferably 0.60 or more, and particularly preferably 0.65 or more. In the present invention, the loss factor at 20° C., which is considered to be a temperature at which the interlayer film is normally used, is employed as an index for sound insulation.

A flexural rigidity at the third resonance frequency calculated according to ISO16940:2008 by the damping test is preferably 60 N·m or more and 200 NI·m or less, and more preferably 70 N In or more and 180 N·m or less. When the flexural rigidity is within the range between the lower limit and the upper limit, high sound insulation over a wide frequency range from the medium frequency range to the high frequency range can be realised.

Generally, when the transparent substrates (for example, glasses) of the outermost layers that sandwich the interlayer film for a laminated glass becomes thin, the loss factor tends to be low. Thus, a structure in which the thicknesses of the two transparent substrates of the outermost layers are different and the cross section of the laminated glass is asymmetric has a decreased loss factor compared to a structure in which the thicknesses of the two transparent substrates of the outermost layers are the same and the cross section of the laminated glass is symmetrical, even when the thicknesses of the laminated glasses in both structures are the same. Meanwhile, in the laminated glass for an automobile windshield, the thickness of the glass outside the automobile is generally limited to about 1.8 mm or more to impart chipping resistance against flying stones. Thus, although the glass inside the automobile needs to be thin to reduce the weight of the laminated glass, in such a case, there is a problem of the decrease in the loss factor as described above. The interlayer film for a laminated glass according to the present invention is useful as a method for solving such a problem.

For the interlayer film for a laminated glass of the present invention, a laminated glass obtained by sandwiching the interlayer film for a laminated glass using two float glasses, each having a length of 300 mm, a width of 25 mm, and a thickness of 19 mm, and pressure bonding them under the conditions of a temperature of 140° C., a pressure of 1 MPa, and 60 minutes preferably has a loss factor at the third resonance frequency measured by damping test of the laminated glass according to the center excitation method at 20° C. of 0.55 or more, more preferably 0.60 or more, and particularly preferably 0.65 or more.

A flexural rigidity at the third resonance frequency calculated according to ISO16940:2008 by the damping test is preferably 60 N·m or more and 200N·m or less, and more preferably 70 N·m or more and 180 N·m or less. When the flexural rigidity is within the range between the lower limit and the upper limit, high sound insulation over a wide frequency range from the medium frequency range to the high frequency range can be realized.

Thus, as an interlayer film used for the laminated glass for an automobile, the interlayer film for a laminated glass of the present invention can be suitably used to increase sound insulation of not only a windshield but also a glass having symmetric laminated glass cross section such as a side window.

A smaller difference $\Delta TL$ ($=TL1-TL2$) between the sound transmission loss (TL2) calculated from the loss factor and flexural rigidity obtained by the damping test and the sound transmission loss (TL1) based on mass law given by the sound field incidence of 0° to 78° given by the following equation means that the decrease in sound insulation by the coincidence effect is more suppressed, and is a desirable sound insulation property.

$$TL1=20\cdot\log(f\cdot m)-47.5$$

In the equation above, f represents each center frequency (Hz) in the ⅓ octave band, and m represents the surface density (kg/m$^2$) of the laminated glass.

In a preferable embodiment of the present invention, in a laminated glass obtained by sandwiching the interlayer film for a laminated glass using a float glass having a length of 300 mm, a width of 25 mm, and a thickness of 19 mm and a chemically strengthened inorganic glass having a length of 300 mm, a width of 25 mm, and a thickness of 0.55 mm, and pressure bonding them under the conditions of a temperature of 140° C., a pressure of 1 MPa, and 60 minutes, the difference $\Delta TL$ between a sound transmission loss (TL1-a) based on mass law given by the sound field incidence of 0° to 78° and a sound transmission loss (TL2-a) calculated from a loss factor at a third resonance frequency measured by the damping test of the laminated glass according to the center excitation method at 20° C. and a flexural rigidity at the third resonance frequency calculated according to ISO 16940: 2008 is 41 dB or less at each center frequency (1,000, 1,250, 1,600, 2,000, 2,500, 3,150, 4,000, 5,000, 6,300, 8,000, and 10,000 Hz) in a ⅓ octave band of 1,000 Hz or more (1,000 Hz to 10,000 Hz).

In a preferable embodiment of the present invention, in a laminated glass obtained by sandwiching the interlayer film for a laminated glass using two float glasses, each having a length of 300 mm, a width of 25 mm, and a thickness of 19 mm, and pressure bonding them under the conditions of a temperature of 140° C., a pressure of 1 MPa, and 60 minutes, the difference $\Delta TL$ between a sound transmission loss (TL1-b) based on mass law given by the sound field incidence of 0° to 78° and a sound transmission loss (TL2-b) calculated from a loss factor at a third resonance frequency measured by the damping test of the laminated glass according to the center excitation method at 20° C. and a flexural rigidity at the third resonance frequency calculated according to ISO 16940: 2008 is 4.1 dB or less at each center frequency (1,000, 1,250, 1,600, 2,000, 2,500, 3,150, 4,000, 5,000, 6,300, 8,000, and 10,000 Hz) in a ⅓ octave band of 1,000 Hz or more (1,000 Hz to 10,000 Hz).

TL1-a and TL1-b are values calculated from the above-mentioned equation to determine TL1.

Conventionally, it has been realized to increase the sound transmission loss in a specific frequency range by adjusting the flexural rigidity through the adjustment of the elastic modulus, etc. of the interlayer film and thereby adjusting the coincidence frequency. However, it has been difficult to sufficiently increase the sound transmission loss over the entire frequency range. For example, when a thermoplastic resin having a low glass transition temperature is used for the A layer, the coincidence frequency is located in the high frequency range, and thus high sound insulation can be exhibited based on mass law in a frequency range from 1,000 Hz to 5,000 Hz. However, in a frequency range of 8,000 Hz to 10,000 Hz, the decrease in sound insulation by the coincidence effect is significant.

By using the laminated glass that exhibits a high loss factor according to the present invention, a high sound transmission loss of a $\Delta$TL of 4.1 dB or less over the entire frequency range can be realized. The $\Delta$TL is more preferably 3.8 dB or less, and particularly preferably 3.5 dB or less.

<Laminated Glass>

The laminated glass of the present invention comprises two transparent substrates; and the interlayer film for a laminated glass of the present invention sandwiched between the two transparent substrates. As described above, by using the interlayer film for a laminated glass of the present invention, a laminated glass having excellent sound insulation, in particular, sound insulation in a frequency range of 2,000 Hz to 10,000 Hz can be obtained. Thus, the interlayer film for a laminated glass of the present invention can be suitably used for a windshield for a vehicle (for example, an automobile), a side window for a vehicle, a sunroof for a vehicle, a rear window for a vehicle, a glass for a head up display or the like. Thus, in a preferable embodiment of the present invention, the laminated glass is a windshield for a vehicle, a side window for a vehicle, a sunroof for a vehicle, a rear window for a vehicle, or a glass for a head up display. The vehicle in the present invention means a train, an electric train, an automobile, a ship, an aircraft or the like.

When a laminated glass comprising two transparent substrates; and the interlayer film for a laminated glass of the present invention sandwiched between the two transparent substrates is applied to a glass for a head up display, the shape of the cross section of the interlayer film is preferably a shape in which one end face side is thick and the other end face side is thin. In that case, the shape of the cross section can be an entirely wedge-shaped shape in which the thickness gradually decreases from one end face side to the other end face side, can be a partially wedge-shaped shape in which the thickness is same from one end face to an arbitrary position between the end face and the other end face, and gradually decreases from the arbitrary position to the other end face, or can be an arbitrary shape regardless of the position as long as it does not cause problems in production. The cross section thicknesses of all the layers can change or the cross section thicknesses of only some layers can change.

In the laminated glass of the present invention, two transparent substrates are usually used in the outermost position. The transparent substrate is not particularly limited, and for example, an inorganic glass, an organic glass, or a combination thereof can be used. Examples of the inorganic glass include a float plate glass, a polished plate glass, a template glass, a mesh plate glass, and a heat ray absorbing plate glass. Examples of the material constituting the organic glass include an acrylic resin (for example, polymethyl methacrylate resin) and a polycarbonate resin. The transparent substrate can be colorless, colored, transparent, or non-transparent.

The thickness of the transparent substrate is not particularly limited, and is preferably 100 mm or less. The interlayer film of the present invention has excellent sound insulation, thus high sound insulation is exhibited even when a thinner transparent substrate is used, thereby, the weight reduction of the laminated glass can be realised. From the viewpoint of weight reduction, the thickness of at least one transparent substrate is preferably 3.0 mm or less, more preferably 2.5 mm or less, further preferably 2.0 mm or less, and particularly preferably 1.8 mm or less. In particular, when the thickness of one transparent substrate is 18 mm or more, the thickness of the other transparent substrate is 1.8 mm or less, and the difference in thickness between the two transparent substrates is 0.2 mm or more, a laminated glass in which film thinning and weight reduction are realized without impairing flexural strength can be produced. The difference in thickness between the two transparent substrates is preferably 0.5 mm or more, and can be 1.0 mm or more.

In a side window for an automobile, a laminated glass in which the thicknesses of the transparent substrates on the outside and inside of the automobile are same is mainly used. Even in such a case, the interlayer film having high sound insulation according to the present invention is suitably used.

In one embodiment of the present invention, the laminated glass is a laminated glass comprising two transparent substrates; and the interlayer film for a laminated glass according to the present invention sandwiched between the two transparent substrates, wherein at least one of the transparent substrates is an inorganic glass having a thickness of 1.2 to 3.0 mm. The thickness is preferably 1.3 to 2.0 mm. In this embodiment, when one of the transparent substrates has the above-mentioned thickness, the thickness of the other transparent substrate is not particularly limited, and is preferably 0.2 to 2.0 mm, and more preferably 0.3 to 1.0 min. The transparent substrate can be a chemically strengthened inorganic glass.

As described in the description of the interlayer film for a laminated glass, the sound insulation of the laminated glass can be evaluated by the loss factor obtained by the damping test according to the center excitation method. It can be said that the higher, the loss factor of the laminated glass, the higher, the sound insulation of the laminated glass.

The loss factor at the third resonance frequency measured by the damping test of the laminated glass according to the center excitation method at 20° C. of the laminated glass of the present invention is preferably 0.55 or more, more preferably 0.60 or more, and particularly preferably 0.65 or more.

The flexural rigidity at the third resonance frequency calculated according to ISO16940:2008 by the damping test of the laminated glass of the present invention is preferably 60 N·m or more and 200 N·m or less, and more preferably 70 N·m or more and 180 N·m or less.

The difference $\Delta$TL (=TL1−TL2) between the sound transmission loss (TL2) calculated from the loss factor and flexural rigidity obtained by the damping test and the sound transmission loss (TL1) based on mass law given by the sound field incidence of 0° to 78° given by the following equation of the laminated glass of the present invention is preferably 4.1 dB or less at each center frequency (1,000, 1,250, 1,600, 2,000, 2,500, 3,150, 4,000, 5,000, 6,300, 8,000, and 10,000 Hz) in a ⅓ octave band of 1,000 Hz or more (1,000 Hz to 10,000 Hz). The ΔTL is more preferably 3.8 dB or less, and particularly preferably 3.5 dB or less.

$$TL1 = 20 \cdot \log(f \cdot m) - 47.5$$

In the equation above, f represents each center frequency (Hz) in the ⅓ octave band, and m represents the surface density (kg/m$^2$) of the laminated glass.

<Method for Producing Laminated Glass>

The laminated glass of the present invention can be produced by a conventionally publicly-known method. Examples of such a method include a method in which a vacuum laminator device is used, a method in which a vacuum bag is used, a method in which a vacuum ring is used, and a method in which a nip roll is used. A method in which an autoclave step is additionally performed after temporary pressure bonding can also be performed.

In the method in which a vacuum laminator device is used, for example, lamination is performed at a temperature of 100° C. or more and 200° C. or less (in particular, 130° C. or more and 170° C. or less) under a reduced pressure of $1 \times 10^{-6}$ MPa or more and $3 \times 10^{-2}$ MPa or less using a publicly-known device used in the production of a solar cell.

The method in which a vacuum bag or a vacuum ring is used is, for example, described in EP 1235683, and lamination is performed, for example, at a temperature of 130° C. or more and 145° C. or less under a pressure of about $2 \times 10^{-2}$ MPa.

Examples of the method in which a nip roll is used include a method in which the first temporary pressure bonding is performed at a temperature equal to or lower than the flow starting temperature of the polyvinyl acetal resin, and then pressure bonding or temporary pressure bonding is further performed under conditions closer to the flow starting temperature. Specific examples thereof include a method in which heating to 30° C. or more and 100° C. or less is performed with an infrared heater and the like, then degassing is performed with a roll to perform temporarily pressure bonding, further heating to 50° C. or more and 150° C. or less is performed, and then pressure bonding or temporarily pressure bonding is performed with a roll.

The autoclave step additionally performed after temporary pressure bonding is, for example, performed under a pressure of 1 MPa or more and 15 MPa or less at a temperature of 120° C. or more and 160° C. or less for 0.5 hour or more and 2 hours or less depending on the thickness and composition of the laminated glass.

EXAMPLES

Hereinafter, although the present invention will be specifically described with reference to Examples and Comparative Examples, the present invention is not limited to these Examples. In the following Examples, "%" means "% by mass" unless otherwise specified.

In the following Examples and Comparative Examples, as the polyvinyl butyral (PVB) resin, a product obtained by acetalizing polyvinyl alcohol having the same viscosity-average polymerization degree as a target viscosity-average polymerization degree (a viscosity-average polymerization degree measured based on JIS K 6726 "Testing method for polyvinyl alcohol") with n-butyraldehyde under a hydrochloric acid catalyst was used.

1. Physical Property Evaluation

<Tan δ Peak Temperature and Tan δ Peak Height of Resin Material Constituting A Layer>

A single-layer sheet having a thickness of 1.0 mm was prepared by pressurizing a resin material constituting the A layer (a hydrogenated product of a block copolymer, hereinafter also referred to as "a hydrogenated block copolymer") at a temperature of 230° C. and a pressure of 10 MPa for 3 minutes. This single-layer sheet was cut into a disc shape and used as a test sheet.

A temperature of a peak at which a tan δ of the resin material constituting the A layer is maximum and a height of the tan δ peak were determined by performing the complex shear viscosity test under a condition of a frequency of 1 Hz according to JIS K7244-10: 2005.

<Measurement of Tensile Storage Elastic Modulus of Resin Material Constituting B Layer or C Layer>

The resin material constituting the B layer or the C layer was pressurized at a temperature of 230° C. and a pressure of 10 MPa for 10 minutes to produce samples having a thickness of 0.8 mm. These samples were cut into pieces each having a width of 3 mm, which were used as samples for dynamic viscoelasticity measurement. A tensile storage elastic modulus at 0° C. was determined by performing the dynamic viscoelasticity test on these samples for measurement according to JIS K7244-4:1999 under a condition of a frequency of 0.3 Hz. The results are shown in Table 1.

TABLE 1

| Resin material | PVB resin + plasticizer (38.8 parts by mass of Kuraray Polyol P-510 relative to 100 parts by mass of PVB resin) | Ionomer resin | Acrylic resin | Poly carbonate resin |
|---|---|---|---|---|
| Layer used | B layer | B layer | C layer | C layer |
| Tensile storage elastic modulus at 0° C. (GPa) | 0.26 | 0.76 | 2.6 | 2.5 |

2. Content of Polymer Block (a)

The resin material constituting the A layer (the hydrogenated block copolymer) was dissolved in CDCl$_3$ to measure a $^1$H-NMR spectrum [instrument: JNM-Lambda 500 (manufactured by JEOL Ltd.), measurement temperature: 50° C.], and a content of the polymer block (a) was calculated from the peak intensity derived from styrene.

3. Glass Transition Temperature of Polymer Block (a) and Polymer Block (b)

Glass transition temperatures of the polymer block (a) and the polymer block (b) contained in the resin material constituting the A layer (hydrogenated block copolymer) were determined by performing differential scanning calorimetry (DSC, manufactured by Seiko Instruments & Electronics Ltd.) on each of a monomer constituting the polymer block (a) used for preparing the hydrogenated block copolymer and the prepared hydrogenated block copolymer. In the measurement, a temperature was increased from −120° C. to 100° C. at a heating rate of 10° C./min, and a temperature at an inflection point of a measurement curve was read, and taken as a glass transition temperature of each block.

4. Evaluation of Sound Insulation Properties (Loss Factor and Flexural Rigidity of Laminated Glass at Third Resonance Frequency)

A laminated glass was produced by sandwiching each interlayer film obtained in Examples and Comparative Examples using two commercially available float glasses (length: 300 mm×width: 25 mm×thickness: 1.9 mm) or one commercially available float glass (length: 300 mm×width: 25 mm×thickness: 1.9 mm) and one commercially available chemically strengthened inorganic glass (length: 300 mm×width: 25 mm×thickness: 0.55 mm) as outermost layers of the laminated glass, and further using one commercially available chemically strengthened inorganic glass (length: 300 mm×width: 25 mm×thickness: 0.55 mm) when a chemically strengthened inorganic glass is used for the C layer in a structure, and pressure bonding them under the conditions of a temperature of 140° C., a pressure of 1 MPa, and 60 minutes.

Then, the central part of the glass having a thickness of 19 mm of the laminated glass was fixed to the tip of an exciting force detector built into an impedance head of a vibration exciter (power amplifier/model 371-A) in a mechanical impedance instrument (manufactured by ONO SOKKI CO., LTD; mass cancel amplifier: mass cancel amplifier MA-5500; channel data station: DS-2100). A damping test of the laminated glass by the center excitation method was performed by applying vibration to the central part of the laminated glass in a frequency range of 0 to 10,000 Hz at 20° C., and detecting an exciting force and acceleration waveform at this exciting point (the central part of the laminated glass to which vibration was applied). A mechanical impedance of the exciting point was obtained based on the obtained exciting force and the speed signal obtained by integrating the acceleration signal, and a loss factor of the laminated glass was obtained from the frequency and the half-width showing the peak in the impedance curve with the frequency on the horizontal axis and the mechanical impedance on the vertical axis. Further, using the third resonance frequency and the loss factor at the third resonance frequency, a flexural rigidity at the third resonance frequency was calculated according to ISO16940:2008.

Example 1

According to the composition shown in Table 2, as a resin material constituting an A layer, a linear hydrogenated styrene-isoprene-styrene triblock copolymer (hydrogenation rate: 93%, weight average molecular weight: 258,000) containing 8% by mass of a styrene unit and 92% by mass of an isoprene unit, and having a tan δ peak temperature of −11.8° C. and a tan δ peak height of 2.5 was used.

As a resin material constituting each B layer, a resin composition consisting of a polyvinyl butyral resin (an acetalization degree: 70 mol %, vinyl acetate unit content: 0.9 mol %, a viscosity-average polymerization degree of polyvinyl alcohol as a raw material: about 1,700) and a plasticizer [polyester polyol manufactured by KURARAY CO., LTD. "Kuraray Polyol β-510" (melting point: −77° C., hydroxyl value: 213.0 to 235.0 mg KOH/g)] (the amount of the plasticizer relative to 100 parts by mass of the polyvinyl butyral resin was 38.8 parts by mass) was used.

Each of these resin materials was extruded to produce an A layer having a thickness of 250 μm and B layers each having a thickness of 250 μm. The obtained A layer was sandwiched between two B layers and press-molded at 150° C. to produce Film of interlayer 1 having a thickness of 750 μm which is a composite film having a three-layer structure.

In Table 2, the outline is shown as Film 1. The material constituting the A layer had a tensile storage elastic modulus at 0° C. measured by performing the dynamic viscoelasticity test under a condition of a frequency of 0.3 Hz according to JIS K 7244-4:1999 of less than 1.0 GPa.

A laminated glass was produced by laminating two obtained Films of interlayer 1, one float glass having a thickness of 1.9 mm, and two chemically strengthened inorganic glasses having a thickness of 0.55 mm according to the structure shown in Table 3, and pressure bonding them under the conditions of a temperature of 140° C., a pressure of 1 MPa, and 60 minutes. A loss factor and a flexural rigidity of the obtained laminated glass are shown in Table 3.

A difference ΔTL between a sound transmission loss (TL1) based on mass law given by the sound field incidence of 0° to 78° and a sound transmission loss (TL2) calculated from the loss factor and the flexural rigidity, on the basis of the weight and size of the laminated glass, was calculated at each center frequency in the ⅓ octave band of 1,000 Hz or more (1,000 Hz to 10,000 Hz). A maximum value among them is shown as the maximum ΔTL (dB) in Table 3.

Example 2 to 11

Each laminated glass was produced in the same manner as in Example 1 except that the film of interlayer was produced according to Table 2 and the structure of the laminated glass shown in Table 3 was employed. The structure of each film of interlayer used is shown in Table 2, and the sound insulation properties of each obtained laminated glass are shown in Table 3.

As a resin material constituting the A layer of each of Films of interlayer 2 to 5 and 8, the same resin material as the resin material constituting the A layer of Film of interlayer 1 was used. As a resin material constituting each B layer of Films of interlayer 2 to 4 and 6 to 8, the same resin material as the resin material constituting each B layer of Film of interlayer 1 was used.

As a resin material constituting the A layer of Film of interlayer 6, a linear hydrogenated styrene-isoprene-styrene triblock copolymer (hydrogenation rate: 91%, weight average molecular weight: 263,000) containing 8% by mass of a styrene unit and 92% by mass of an isoprene unit, and having a tan δ peak temperature of −4.5° C. and a tan δ peak height of 2.5 was used.

As a resin material constituting the A layer of Film of interlayer 7, a linear hydrogenated styrene-isoprene-styrene triblock copolymer (hydrogenation rate: 91%, weight average molecular weight: 278,000) containing 8% by mass of a styrene unit and 92% by mass of an isoprene unit, and having a tan δ peak temperature of −16.4° C. and a tan δ peak height of 2.6 was used.

The resin materials constituting the A layer of Film of interlayer 6 and the A layer of Film of interlayer 7 had a tensile storage elastic modulus at 0° C. measured by performing the dynamic viscoelasticity test under a condition of a frequency of 0.3 Hz according to JIS K 72444:1999 of less than 1.0 GPa.

As an ionomer resin of the resin material constituting each B layer of Film of interlayer 5, SentryGlas® Interlayer manufactured by DuPont was used.

As each C layer in Examples 2 to 7, the same chemically strengthened inorganic glass as in Example 1 was used.

As each C layer in Examples 8 to 11, a commercially available acrylic resin sheet or a polycarbonate resin sheet having a predetermined thickness was used.

Example 12

Film of interlayer 8 was produced in the same manner as in Example 1 except that the structure having one A layer and one B layer was employed as shown in Table 2. Then, a laminated glass was produced in the same manner as in Example 1 except that each A layer was placed in contact with a commercially available acrylic resin sheet having a thickness of 1 mm as the C layer. The sound insulation properties of the obtained laminated glass are shown in Table 3.

TABLE 2

|   |   |   |   | Film 1 | Film 2 | Film 3 | Film 4 | Film 5 | Film 6 | Film 7 | Film 8 |
|---|---|---|---|---|---|---|---|---|---|---|---|
| A layer | Resin material (hydrogenated block copolymer) | Polymer block (a) | Content (% by mass) | 8 | 8 | 8 | 8 | 8 | 8 | 8 | 8 |
|   |   |   | Aromatic vinyl monomer unit (mol %) | Styrene 100 | Styrene 100 | Styrene 100 | Styrene 100 | Styrene 100 | Styrene 100 | Styrene 100 | Styrene 100 |
|   |   |   | Tg (° C.) | 100 | 100 | 100 | 100 | 100 | 100 | 100 | 100 |
|   |   | Polymer block (b) | Content (% by mass) | 92 | 92 | 92 | 92 | 92 | 92 | 92 | 92 |
|   |   |   | Conjugated diene monomer unit (mol %) | Isoprene 100 | Isoprene 100 | Isoprene 100 | Isoprene 100 | Isoprene 100 | Isoprene 100 | Isoprene 100 | Isoprene 100 |
|   |   |   | Vinyl bond content (mol %) | 55 | 55 | 55 | 55 | 55 | 62 | 51 | 55 |
|   |   |   | Tg (° C.) | −19 | −19 | −19 | −19 | −19 | −13 | −23 | −19 |
|   |   | Thickness (μm) |   | 250 | 125 | 400 | 375 | 215 | 250 | 250 | 250 |
|   | Properties | tan δ peak temperature (° C.) |   | −11.8 | −11.8 | −11.8 | −11.8 | −11.8 | −4.5 | −16.4 | −11.8 |
|   |   | tan δ peak height |   | 2.5 | 2.5 | 2.5 | 2.5 | 2.5 | 2.5 | 2.6 | 2.5 |
| B layer | Resin material (parts by mass) | PVB resin |   | 100 | 100 | 100 | 100 | — | 100 | 100 | 100 |
|   |   | Ionomer resin |   | — | — | — | — | 100 | — | — | — |
|   |   | Plasticizer |   | 38.8 | 38.8 | 38.8 | 38.8 | — | 38.8 | 38.8 | 38.8 |
|   | Thickness (μm) |   |   | 250 | 125 | 250 | 375 | 535 | 250 | 250 | 250 |
|   | Film structure |   |   | B/A/B | B/A/B | B/A/B | B/A/B | B/A/B | B/A/B | B/A/B | B/A |
|   | Total thickness of film (μm) |   |   | 750 | 375 | 900 | 1125 | 1285 | 750 | 750 | 500 |

TABLE 3

|   |   | Example 1 | Example 2 | Example 3 | Example 4 | Example 5 | Example 6 |
|---|---|---|---|---|---|---|---|
| Structure of laminated glass | Thickness of float glass (mm) | 1.9 | 1.9 | 1.9 | 1.9 | 1.9 | 1.9 |
|   | Film type | Film 1 | Film 1 | Film 1 | Film 2 | Film 3 | Film 5 |
|   | C layer Material | Chemically strengthened inorganic glass | Chemically strengthened inorganic glass | Chemically strengthened inorganic glass | Chemically strengthened inorganic glass | Chemically strengthened inorganic glass | Chemically strengthened inorganic glass |
|   | Thickness (mm) | 0.55 | 0.55 | 0.55 | 0.55 | 0.55 | 0.55 |
|   | Film type | Film 1 | Film 6 | Film 7 | Film 2 | Film 2 | Film 5 |
|   | Type and thickness of glass (mm) | Chemically strengthened inorganic glass 0.55 | Chemically strengthened inorganic glass 0.55 | Chemically strengthened inorganic glass 0.55 | Chemically strengthened inorganic glass 0.55 | Chemically strengthened inorganic glass 0.55 | Chemically strengthened inorganic glass 0.55 |
| Structure of interlayer film |   | B/A/B/C/B/A/B | | | | | |
| Third resonance frequency | Loss factor | 0.63 | 0.56 | 0.60 | 0.56 | 0.59 | 0.72 |
|   | Flexural rigidity | 99.6 | 104.2 | 74.9 | 93.5 | 73.5 | 107.4 |
|   | Maximum ΔTL (dB) | 3.4 | 4.0 | 3.9 | 4.0 | 3.8 | 3.0 |

TABLE 3-continued

|  |  | Example 7 | Example 8 | Example 9 | Example 10 | Example 11 | Example 12 |
|---|---|---|---|---|---|---|---|
| Structure of laminated glass | Thickness of float glass (mm) | 1.9 | 1.9 | 1.9 | 1.9 | 1.9 | 1.9 |
|  | Film type C Material layer | Film 1 Chemically strengthened inorganic glass | Film 1 Acrylic resin | Film 1 Acrylic resin | Film 1 Polycarbonate resin | Film 1 Acrylic resin | Film 8 Acrylic resin |
|  | Thickness (mm) | 0.55 | 0.3 | 0.8 | 2.0 | 0.5 | 1.0 |
|  | Film type Type and thickness of glass (mm) | Film 1 Float glass 1.9 | Film 1 Chemically strengthened inorganic glass 0.55 | Film 1 Chemically strengthened inorganic glass 0.55 | Film 1 Chemically strengthened inorganic glass 0.55 | Film 1 Float glass 1.9 | Film 8 Chemically strengthened inorganic glass 0.55 |
| Structure of interlayer film |  |  |  | B/A/B/C/B/A/B |  |  | B/A/C/A/B |
| Third resonance frequency | Loss factor | 0.59 | 0.67 | 0.82 | 0.67 | 0.64 | 0.72 |
|  | Flexural rigidity | 150.6 | 92.5 | 97.8 | 171.0 | 163.6 | 82.8 |
|  | Maximum ΔTL (dB) | 3.7 | 3.1 | 2.5 | 3.1 | 3.6 | 2.9 |

Comparative Examples 1 to 8

Each laminated glass was produced and the sound insulation properties of each of the obtained laminated glasses were measured in the same manner as in Example 1 except that each film of interlayer was produced according to Table 4 and the film of interlayer, a float glass, and a chemically strengthened inorganic glass were used so that each structure shown in Table 5 was obtained.

As a resin material constituting the A layer of Film of interlayer 9, a resin composition consisting of a polyvinyl butyral resin (an acetalization degree: 70 mol %, vinyl acetate unit content: 0.9 mol %, a viscosity-average polymerization degree of polyvinyl alcohol as a raw material: about 1,700) and a plasticizer [polyester polyol manufactured by KURARAY CO., LTD. "Kuraray Polyol β-510" (melting point: −77° C., hydroxyl value: 213.0 to 235.0 mg KOH/g)] (the amount of the plasticizer relative to 100 parts by mass of the polyvinyl butyral resin was 60 parts by mass) was used.

As a resin material constituting each B layer of Films of interlayer 9 and 10, the same polyvinyl butyral resin composition as the resin material constituting the B layer of Example 1 was used.

The glass with a thickness of 16 mm used in Comparative Example 2 was a commercially available float glass, and each glass with a thickness of 1.1 mm used in Comparative Examples 3 and 4 was a commercially available float glass.

The structures in Comparative Examples 1 to 4, 7 and 8 had no layer corresponding to the C layer. In Comparative Example 5, although an interlayer film for a laminated glass consisting of a C layer and two Films of interlayer 9 was used, the tan δ peak height of the resin material constituting the A layer in Film of interlayer 9 was less than 1.5. In Comparative Example 6, although an interlayer film for a laminated glass consisting of a C layer, Film of interlayer 9, and Film of interlayer 10 was used, the tan δ peak height of the resin material constituting the A layer in Film of interlayer 9 was less than 1.5, and Film of interlayer 10 had no layer corresponding to the A layer.

TABLE 4

|  |  |  | Film 9 | Film 10 |
|---|---|---|---|---|
| A layer | Resin material (parts by mass) | PVB resin | 100 | — |
|  |  | Plasticizer | 60 | — |
|  | Thickness (μm) |  | 100 | — |
|  | Properties | tan δ peak temperature (° C.) | 0.7 | — |
|  |  | tan δ peak height | 0.79 | — |
| B layer | Resin material (parts by mass) | PVB resin | 100 | 100 |
|  |  | Plasticizer | 38.8 | 38.8 |
|  | Thickness (μm) |  | 325 | 750 |
|  | Film structure |  | B/A/B | B |
| Total thickness of film (μm) |  |  | 750 | 750 |

TABLE 5

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Structure of laminated glass | Thickness of float glass (mm) | 1.9 | 1.9 | 1.9 | 1.9 | 1.9 | 1.9 | 1.9 | 1.9 |
|  | Film type C Material layer | Film 1 — | Film 1 — | Film 1 — | Film 4 — | Film 9 Chemically strengthened inorganic glass | Film 9 Chemically strengthened inorganic glass | Film 1 — | Film 1 — |
|  | Thickness (mm) | — | — | — | — | 0.55 | 0.55 | — | — |

TABLE 5-continued

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
|  | Film type | — | — | — | — | Film 9 | Film 10 | Film 1 | Film 1 |
|  | Type and thickness of glass (mm) | Chemically strengthened inorganic glass 0.55 | Float glass 1.6 | Float glass 1.1 | Float glass 1.1 | Chemically strengthened inorganic glass 0.55 | Chemically strengthened inorganic glass 0.55 | Chemically strengthened inorganic glass 0.55 | Float glass 1.9 |
| Structure of interlayer film |  |  | B/A/B/ |  |  | B/A/B/ C/B/A/B | B/A/B C/B | B/A/B/B/A/B |  |
| Third resonance frequency | Loss factor | 0.33 | 0.49 | 0.51 | 0.53 | 0.47 | 0.35 | 0.51 | 0.50 |
|  | Flexural rigidity | 66.3 | 113.7 | 95.1 | 99.5 | 141 | 100.1 | 82.1 | 157.8 |
| Maximum ΔTL (dB) |  | 6.9 | 4.5 | 4.5 | 4.2 | 5.6 | 6.8 | 4.6 | 4.4 |

Comparison of the sound insulation properties and maximum ΔTLs in Table 3 and Table 5 shows while the laminated glasses in Examples 1 to 12 have a high loss factor of 0.55 or more and a low maximum ΔTL of 4.1 or less, the laminated glasses in Comparative Examples 1 to 8 have a loss factor of less than 0.55 and a maximum ΔTL of more than 4.1. These results show that the interlayer film for a laminated glass of the present invention has high sound insulation, and the laminated glass comprising such an interlayer film for a laminated glass has sound insulation.

INDUSTRIAL APPLICABILITY

The interlayer film for a laminated glass and the laminated glass of the present invention are particularly suitably used for a glass for a vehicle that requires high sound insulation (for example, a window glass for a vehicle).

DESCRIPTION OF REFERENCE SIGNS

1a: A layer
1b: A layer
2a: B layer
2b: B layer
2c: B layer
2d: B layer
3: C layer

The invention claimed is:

1. An interlayer film, comprising in sequence:
a first A layer:
a C layer:
a second A layer: and
a B layer at any place between or outside the ACA layer sequence,
wherein each A layer comprises a thermoplastic resin, having
a peak at which a tan δ measured by performing a complex shear viscosity test under a condition of a frequency of 1 Hz according to JIS K 7244-10: 2005 is maximum in a range of −30° C. or more and 10° C. or less,
the thermoplastic resin of each A layer comprises a hydrogenated product of a block copolymer having a polymer block (a) comprising 60 mol % or more of an aromatic vinyl monomer unit and a polymer block (b) comprising 60 mol % or more of a conjugated diene monomer unit,
the thermoplastic resin of at least one of the first and second A layers has a height of the peak of a tan δ of 1.5 or more,
the C layer comprises an inorganic glass having a thickness of 0.1 mm or more and 1.5 mm or less, or
the C layer comprises a thermoplastic resin having a tensile storage elastic modulus at 0° C. measured by performing a dynamic viscoelasticity test under a condition of a frequency of 0.3 Hz according to JIS K 7244-4:1999 of 1.0 GPa or more, and a thickness is 0.25 mm or more and 2.5 mm or less, and
the B layer comprises a polyvinyl acetal resin or an ionomer resin.

2. The interlayer film according to claim 1, wherein,
wherein a content of the polymer block (a) is 25% by mass or less based on a total mass of the block copolymer.

3. The interlayer film according to claim 1, wherein the B layer comprises the polyvinyl acetal resin and further comprises a plasticizer and a content of the plasticizer is 50 parts by mass or less relative to 100 parts by mass of the polyvinyl acetal resin.

4. The interlayer film according to claim 3, wherein the plasticizer is an ester-based plasticizer or an ether-based plasticizer having a melting point of 30° C. or less and a hydroxyl value of 15 to 450 mgKOH/g.

5. The interlayer film according to claim 1, wherein the layer C comprises the inorganic glass and the inorganic glass is a chemically strengthened inorganic glass.

6. The interlayer film according to claim 1, wherein the layer C comprises the thermoplastic resin and the thermoplastic resin is selected from the group consisting of an acrylic resin, a polycarbonate resin, a polyester resin, and a polyvinyl acetal resin.

7. The interlayer film according to claim 6, wherein the layer C comprises the polyvinyl acetal resin and further comprises a plasticizer and a content of the plasticizer is 30 parts by mass or less relative to 100 parts by mass of the polyvinyl acetal resin.

8. The interlayer film according to claim 7, wherein the plasticizer is an ester-based plasticizer or an ether-based plasticizer having a melting point of 30° C. or less and a hydroxyl value of 15 to 450 mgKOH/g.

9. The interlayer film according to claim 1, wherein in a laminated glass obtained by sandwiching the interlayer film between a float glass having a length of 300 mm, a width of 25 mm, and a thickness of 1.9 mm and a chemically strengthened inorganic glass having a length of 300 mm, a width of 25 mm, and a thickness of 0.55 mm, a loss factor at a third resonance frequency measured by a center excitation method at 20° C. is 0.55 or more.

10. The interlayer film according to claim 1, wherein a difference ΔTL between a sound transmission loss (TL1-a)

based on mass law given by a sound field incidence of 0° to 78° and a sound transmission loss (TL2-a) calculated from a loss factor at a third resonance frequency measured by a center excitation method at 20° C. and a flexural rigidity at the third resonance frequency calculated according to ISO 16940: 2008 in a laminated glass obtained by sandwiching the interlayer film between a float glass having a length of 300 mm, a width of 25 mm, and a thickness of 1.9 mm and a chemically strengthened inorganic glass having a length of 300 mm, a width of 25 mm, and a thickness of 0.55 mm is 4.1 dB or less at each center frequency in a ⅓ octave band of 1,000 Hz or more.

11. The interlayer film according to claim 1, wherein in a laminated glass obtained by sandwiching the interlayer film between two float glasses, each having a length of 300 mm, a width of 25 mm, and a thickness of 1.9 mm, a loss factor at a third resonance frequency measured by a center excitation method at 20° C. is 0.55 or more.

12. The interlayer film according to claim 1, wherein a difference ΔTL between a sound transmission loss (TL1-b) based on mass law given by a sound field incidence of 0° to 78° and a sound transmission loss (TL2-b) calculated from a loss factor at a third resonance frequency measured by a center excitation method at 20° C. and a flexural rigidity at the third resonance frequency calculated according to ISO 16940: 2008 in a laminated glass obtained by sandwiching the interlayer film between two float glasses, each having a length of 300 mm, a width of 25 mm, and a thickness of 1.9 mm, is 4.1 dB or less at each center frequency in a ⅓ octave band of 1,000 Hz or more.

13. The interlayer film according to claim 1, wherein at least one of layers A, B and C further comprises a heat shield material.

14. The interlayer film according to claim 13, wherein the heat shield material is at least one selected from the group consisting of
tin-doped indium oxide, antimony-doped tin oxide, zinc antimonate, metal-doped tungsten oxide, diimonium-based dye, aminium-based dye, phthalocyanine-based dye, anthraquinone-based dye, polymethine-based dye, a benzenedithiol-type ammonium-based compound, a thiourea derivative, thiol metal complex, aluminum-doped zinc oxide, tin-doped zinc oxide, silicon-doped zinc oxide, lanthanum hexaboride, and vanadium oxide.

15. The interlayer film according to claim 1, wherein at least one of layers A, B and C further comprises an ultraviolet absorber.

16. The interlayer film according to claim 15, wherein the ultraviolet absorber is at least one selected from the group consisting of a benzotriazole-based compound, a benzophenone-based compound, a triazine-based compound, a hindered amine-based compound, a benzoate-based compound, a malonic ester-based compound, an indole-based compound, and an anilide oxalate-based compound.

17. The interlayer film according to claim 1, wherein
the interlayer film at least comprises in sequence the A layer, the B layer, the C layer, the B layer, and the A layer,
the C layer is directly adjacent to each of the two B layers, and
the C layer is a layer composed of an inorganic glass.

18. The interlayer film according to claim 1, wherein the interlayer film at least comprises in sequence the B layer, the A layer, the C layer, and the A layer.

19. The interlayer film according to claim 18, wherein the C layer comprises the thermoplastic resin.

20. A laminated glass comprising:
two transparent substrates; and
the interlayer film according to claim 1 sandwiched between the two transparent substrates,
wherein at least one of the two transparent substrates is an inorganic glass having a thickness of 1.2 to 3.0 mm.

21. The laminated glass according to claim 20, which is a windshield for a vehicle, a side window for a vehicle, a sunroof for a vehicle, a rear window for a vehicle, or a glass for a head up display.

* * * * *